United States Patent [19]
Lim et al.

[11] Patent Number: 5,483,285
[45] Date of Patent: Jan. 9, 1996

[54] MOVIE CAMERA SYSTEM HAVING VIEW FINDING AND PROJECTING OPERATIONS AND METHOD

[75] Inventors: Jae C. Lim, Incheon-si; Myung K. Yeo, Kyungki-do; Yong T. Lim, Seoul; Nam S. Lee, Kyungki-do; Jin W. Seo, Seoul; Dae S. Shim, Incheon-si, all of Rep. of Korea

[73] Assignee: Goldstar Co., Ltd., Seoul, Rep. of Korea

[21] Appl. No.: 47,440

[22] Filed: Apr. 16, 1993

[30] Foreign Application Priority Data

Apr. 17, 1992 [KR] Rep. of Korea .................... 6432/1992
Nov. 16, 1992 [KR] Rep. of Korea .................. 21486/1992
Feb. 18, 1993 [KR] Rep. of Korea .................... 2246/1993

[51] Int. Cl.$^6$ ........................................ H04N 5/30
[52] U.S. Cl. ...................... 348/341; 348/333; 348/344
[58] Field of Search .............................. 348/341, 342, 348/343, 344, 207, 744, 751, 756, 790, 791, 792, 793, 333; 345/87, 126; H04N 5/30

[56] References Cited

U.S. PATENT DOCUMENTS

| 5,099,265 | 3/1992 | Lee | 348/333 |
| 5,185,712 | 2/1993 | Sato et al. | 348/333 |
| 5,267,029 | 11/1993 | Kurematsu et al. | 348/751 |
| 5,315,334 | 5/1994 | Inana | 348/333 |

FOREIGN PATENT DOCUMENTS 3-78374  4/1991  Japan .......................... H04N 5/225

*Primary Examiner*—Yon J. Couso
*Assistant Examiner*—Tuan V. Ho
*Attorney, Agent, or Firm*—Finnegan, Henderson, Farabow, Garrett & Dunner

[57] ABSTRACT

A move camera system having a function for projecting an image of an object being presently or previously imaged on an external screen, as well as a function for monitoring the image and a method of displaying a video signal therein. A composite video signal from a camera section or a VCR section is processed by a video signal processor in a display section so that be displayed on a display device including a matrix of pixels. The processed video signal from the video signal processor includes red, green and blue color signals. Arrangement of the proposed video signal is changed according to whether the projecting junction of the view finding function is selected. According to the selected function, an optical image resulting from the video signal displayed on the display device is lighted by a large or small amount of light from a light source at the rear. The user can view or monitor the image on the display device through a focus lens unit at a front portion thereof. The image on the display device is also projected on an external screen by a large amount of light from the light source. A memory may be used to change the arrangement of the video signal before application to the display section. In this case, the display section functions only to sequentially display the video signals therein.

6 Claims, 21 Drawing Sheets

MOVIE CAMERA SYSTEM HAVING VIEW FINDING AND PROJECTING OPERATIONS AND METHOD

FIELD OF THE INVENTION

The present invention relates in general to movie camera systems, and more particularly to a movie camera system having a projecting function as well as a view finding function.

DESCRIPTION OF THE RELATED ART

Generally, an electronic movie camera system may be called a camcorder, and may comprise essentially three parts, a video cassette recorder (VCR) for recording a video signal of an object being imaged, a camera for imaging the object and a view finder for monitoring the resultant video picture. One example of this form of movie camera system is schematically shown in a block form in FIG. 1.

As shown in FIG. 1, the conventional movie camera system comprises a camera section 1 for imaging an object and converting the resulting image into an electrical video signal, a video signal processing circuit 2 for producing a composite video signal based on the video signal from the camera section 1, the composite video signal being comprised of luminance and color signals, a VCR section 3, having a recording part 3a for recording the composite video signal from the video signal processing circuit 2 on a VCR tape and a playback part 3b for playing back the composite video signal recorded on the VCR tape, and a view finder circuit 4 for processing the composite video signal from the VCR section 3 or from the video signal processing circuit 2 so that an image corresponding to the composite video signal can be displayed on a liquid crystal display (LCD) device or panel 5a of a view finder 5. The view finder 5 is adapted to display the processed video signal from the view finder circuit 4 on the LCD device 5a thereof so that the user can monitor an image of the object presently framed or previously imaged.

In FIG. 2a, there is shown a schematic sectional view of the view finder 5 in FIG. 1. As shown, the view finder 5 includes a view finder housing 5b, the LCD panel 5a being disposed in the view finder housing 5b, a first polarizing plate 5c disposed at the front of the LCD panel 5a, a second polarizing plate 5d positioned at the rear of the LCD panel 5a, a light source 5e disposed adjacent to the rear of the second polarizing plate 5d, and an eye lens 5f positioned at the front of the first polarizing plate 5c.

In FIG. 2b, there is shown a schematic block diagram of the view finder circuit 4 in FIG. 1. As shown, the view finder circuit 4 includes a signal processor 4a for processing the composite video signal from the VCR section 3 or from the video signal processing circuit 2 so that the composite video signal can be displayed on the LCD panel 5a of the view finder 5, an LCD driver 4b for driving the LCD panel 5a of the view finder 5 to display the processed video signal from the signal processor 4a on the LCD panel 5a, a synchronization controller 4c for synchronizing vertical and horizontal portions of the video signal being displayed on the LCD panel 5a, and a light source driver 4d for driving the light source 5e of the view finder 5 so that the light source 5e can provide back light to the LCD panel 5a. The camcorder containing this form of LCD view finder is available from SONY or SANYO Company, Japan, for example.

The operation of the conventional movie camera system with the above-mentioned construction will now be described.

First, the camera section 1 images a framed object and outputs the resultant electrical video signal to the video signal processing circuit 2, which produces a composite video signal based on the video signal from the camera section 1 and outputs the composite video signal to the VCR section 3. The composite video signal is comprised of luminance and color signals Y and C, respectively. Upon receiving the composite video signal from the video signal processing circuit, the recording part 3b of the VCR section 3 records the received composite video signal on the VCR tape. The composite video signal from the video signal processing circuit 2 is also transferred to the view finder circuit 4, which performs a process such that the composite video signal can be displayed on the LCD panel 5a of the view finder 5. The processed video signal from the view finder circuit 4 is provided for the LCD panel 5a of the view finder circuit 5, resulting in a desired image being displayed on the LCD panel 5a.

The desired image is displayed on the LCD panel 5a, being lighted in a proper amount by the light source 5e, so that the user can frame the object and view the image on the LCD panel 5a through the eye lens 5f. In this manner, the user, during framing the object, can monitor through the view finder 5 the played back video signal from the VCR tape as well as the image of the object framed.

In FIG. 3a, a schematic sectional view of a conventional projector 6 is shown to include a projector housing 6a, an LCD panel 6b disposed centrally in the projector housing 6a, a first polarizing plate 6c positioned at the front of the LCD panel 6b, a second polarizing plate 6d positioned at the rear of the LCD panel 6b, a light source 6e located at a certain distance from the rear of the second polarizing plate 6d, and a projection lens 6f disposed at an opening of the projector housing 6a.

FIG. 3b is a schematic block diagram of a projector circuit 7 for operating the projector 6 shown in FIG. 3a. As shown, the projector circuit 7 includes a signal processor 7a for processing any one of video signals from a VCR, a movie camera and a television receiver, so that the video signal image can be displayed on the LCD panel 6b of the projector 6, an LCD driver 7b for driving the LCD panel 6b of the projector 6 to display the processed video signal from the signal processor 7a on the LCD panel 6b, a synchronization controller 7c for synchronizing vertical and horizontal portions of the video signal being displayed on the LCD panel 6b, a light source controller 7d for controlling an amount of light from the light source 6e, and an audio signal processor 7e for processing any one of audio signals from the VCR, the movie camera and the television receiver so that the audio signal can be outputted through a speaker SP. This form of projector may be available from SANYO or FUJI Company, Japan, for example.

Operation of the conventional projector with the above-mentioned construction will be described with reference to FIGS. 3a and 3b.

First, a selected one of the video signals from the VCR, the camcorder and the television receiver is processed by the signal processor 7a so that the selected video signal can be displayed on the LCD panel 6b, and then applied to the LCD driver 7b. The LCD driver 7b drives the LCD panel 6b, thereby to display the output signal from the signal processor 7a on the LCD panel 6b. At this time, the synchronization controller 7c synchronizes the vertical and horizontal portions of the video signal being displayed on the LCD panel 6b and the light source controller 7d controls an amount of light from the light source 6e so that the video signal displayed on the LCD panel 6b can be projected on a screen.

Accordingly, the video signal on the LCD panel 6b is condensed on the projection lens 6f by a proper amount of light from the light source 6e and then projected onto a screen at the front, resulting in a desired image being displayed on the screen.

However, the above-mentioned conventional systems have the following disadvantages.

First, only one person can monitor the image of the object being framed or previously framed through the view finder in the conventional movie camera. For example, when many persons picnic out of town, they cannot simultaneously monitor the image of the object presently or previously framed since a separate monitor or television receiver is not present in the fields.

Second, it is inconvenient to connect the movie camera system to the television receiver or monitor when many persons, in a home or office, are to view simultaneously the image shot by the movie camera system, although the monitor or television receiver is present in the home or office. It is also difficult, if not impossible, to provide a wide screen for many persons because the screen of the television receiver or monitor is limited in size.

Third, a separate projector is required to be connected to the movie camera system when many persons are to view simultaneously a wide screen presentation of the image recorded by the movie camera system.

Fourth, when the user is to view the image recorded by the movie camera system on a wide screen such as, for example, a screen in a cinema house, an expensive separate projector is required.

SUMMARY OF THE INVENTION

The present invention has been made in view of the above problems and has, as an object, the provision of a movie camera system capable of projecting an image of an object, being presently or previously framed, on an external screen as well as a capability to monitor the image.

It is another object of the present invention to provide a method of displaying a video signal image, from a camera section or a VCR section, on an LCD panel of a view finder, or for projecting the analog composite video signal onto an external screen through the LCD panel in a movie camera system having the view finder, the camera section and the VCR section integrated therewith.

In accordance with one aspect of the present invention, there is provided a movie camera system comprising camera means for imaging an object and converting the resulting image into an analog composite video signal. Video signal recording means records the video signal from the camera means on a recording medium, and video signal playback plays back the video signal recorded on the recording medium. Key signal input means, responsive to a user selection, provides a mode select signal to select one of the video signal from the camera means and the video signal played back by the video signal playback means, a function select signal to select one of a view finding function and a projecting function, and a recording select signal to select the video signal recorded by the video signal recording means. Control means generates a first control signal in response to the mode select signal from the key signal input means, a second control signal in response to the function select signal from the key signal input means, and a third control signal in response to the recording select signal from the key signal input means. First switching means, responsive to the third control signal from the control means, transfers the video signal from the camera means to the video signal recording means, and second switching means, responsive to the first control signal from the control means, selectively transfers as an output video signal one of the video signal from the camera means and the video signal played back by the video signal playback means. Display means, responsive to the second control signal from the control means, view-finds the output video signal thereon or projects the output video signal on an external screen.

In accordance with another aspect of the present invention, there is provided a movie camera system comprising camera means for imaging an object and converting the resulting image into an digital composite video signal.. Key signal input means, responsive to a user selection, provides a function select signal to select one of a view finding function and a projecting function, and control means, responsive to the function select signal provided by the key signal input means, generates a control signal. Memory means stores the digital composite video signal from the camera means, changes an arrangement of the stored digital composite video signal suitably to the view finding function or the projecting function in response to the control signal from the control means, and outputs the digital composite video signal having the changed arrangement. Digital/ analog converting means converts the digital composite video signal outputted by the memory means into an analog composite video signal, and display means, responsive to the control signal from the control means, view-finds the analog composite video signal converted by the digital/analog converting means thereon or projects the analog composite video signal on an external screen.

In accordance with still another aspect of the present invention, in a movie camera system having a view finder, a camera section and a VCR section integrated therewith, the view finder including a liquid crystal display (LCD) panel, a method of displaying a video signal image from the camera section or a video signal from the VCR section on the LCD panel of the view finder, is provided. The method comprises the steps of generating a first control signal in response to a mode select signal provided for the movie camera system to select one of the video signal from the camera section and video signal from the VCR section, generating a second control signal in response to a function select signal provided for the movie camera system to select one of a projecting function and a view finding function, and selecting one of the video signal from the camera section and the video signal from the VCR section in response to the first control signal. The selected video signal is processed so that it can be displayed on the LCD panel of the view finder, and an arrangement of the processed video signal is changed suitably to the view finding function or the projecting function in response to the second control signal. The video signal having the changed arrangement is view-finded on the LCD panel or projected on an external screen through the LCD panel in response to the second control signal.

BRIEF DESCRIPTION OF THE DRAWINGS

The above and other objects, features and advantages of the present invention will be more clearly understood from the following detailed description taken in conjunction with the accompanying drawings, in which:

FIG. 4b is an exploded perspective view illustrating a projecting process directly utilizing the view finder of FIG. 4a;

DETAILED DESCRIPTION OF THE INVENTION

Figure 4A:
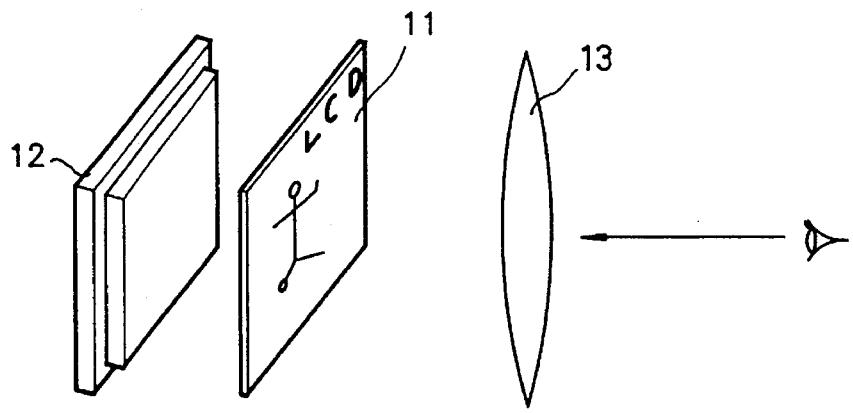
FIG. 4a is an exploded perspective view illustrating a generic principle of a conventional view finder which is installed in a movie camera system.

FIG. 4a depicts a generic principle of a conventional view finder which is installed in a movie camera system. As shown in this figure, a video signal is displayed on an LCD panel 11, the LCD panel 11 being illuminated in a proper amount by a back light 12 at the rear of the LCD panel 11, resulting in a desired image being displayed on the LCD panel 11. The user of the movie camera system can monitor the image on the LCD panel 11 through an eye lens 13 at the front portion of the view finder. This process is generally called a "view-find."

In the construction as shown in FIG. 4a, the amount of light from the back light 12 for the view-find is insufficient to project the image displayed on the LCD panel 11 on an external screen. For this reason, in order to project the image on the LCD panel 11 on the external screen, a light source such as a halogen lamp 14 in FIG. 4b must be employed instead of the back light 12.

Figure 4B:
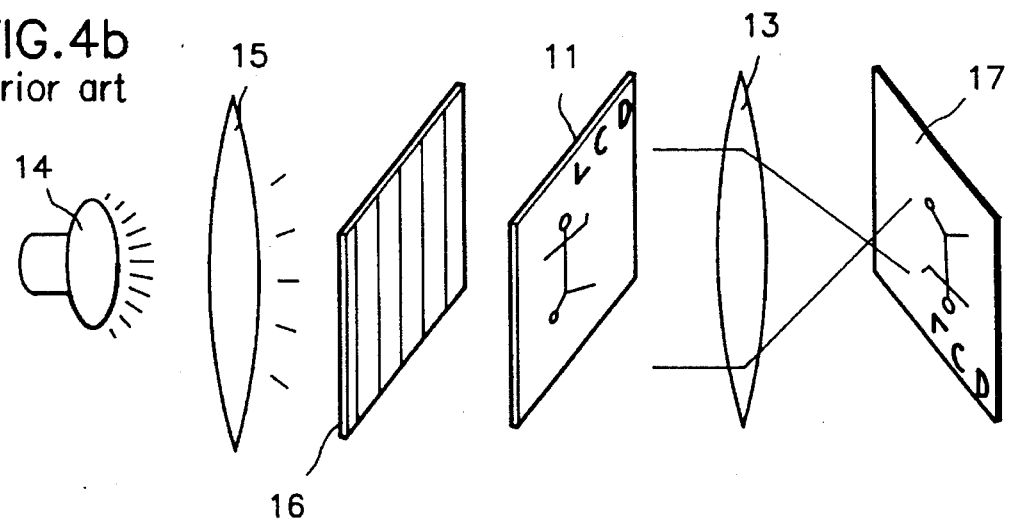

In FIG. 4b, a video signal having an arrangement for the view-find is displayed on the LCD panel 11, the LCD panel 11 being lighted in a proper amount by the halogen lamp 14, resulting in a desired image being displayed on the LCD panel 11. The light from the halogen lamp 14 is condensed by a condensing lens 15 and then polarized by a polarizing plate 16. The polarized light from the polarizing plate 16 is applied toward the rear of the LCD panel 11. At this time, the image displayed on the LCD panel 11 is projected to an external screen 17 through the eye lens 13 by the polarized light from the polarizing plate 16.

According to the construction in FIG. 4b, however, the image on the LCD panel 11, when projected on the external screen 17, is inverted, because the lens 13 is arranged for the view-find. For this reason, it is not possible for the user to view a true image on the screen 17. In order to correctly view the image being projected on the external screen 17, the image displayed on the LCD panel 11 for the view-find must be inverted. It is not difficult to change the orientation of the image on the LCD panel 11, which is a matrix of pixels.

Figure 4C:
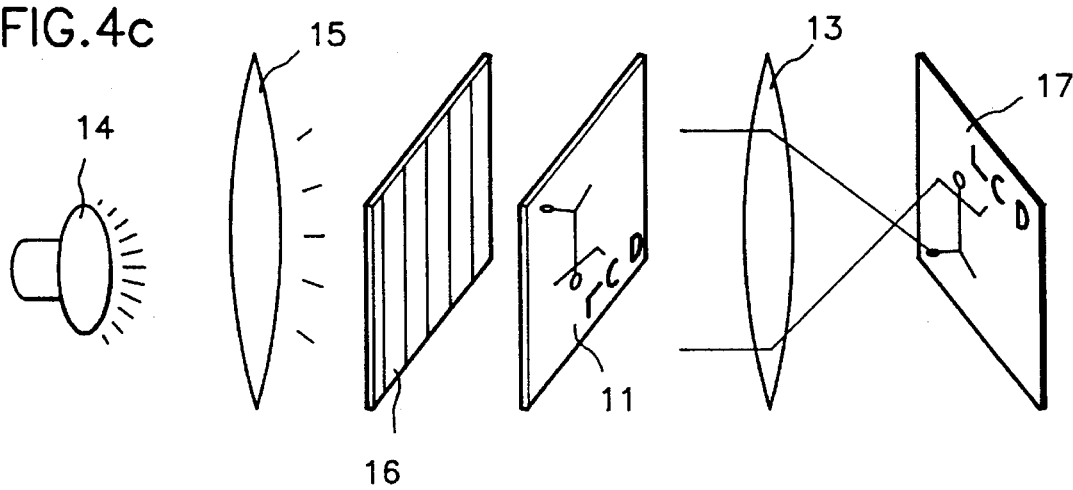
FIG. 4c is a similar view illustrating a projecting process utilizing an improved view finder.

FIG. 4c illustrates the case of turning the image on the LCD panel 11 upside down to project it on the external screen 17 right side up. It can be seen from this figure that the image on the LCD panel 11 is projected correctly on the external screen 17.

As mentioned above, the change of the arrangement of the image on the LCD panel which is commonly installed in the view finder of the movie camera system enables either the view finding or the projection of the image.

Various embodiments of the present invention employing the above principle will hereinafter be described. The following embodiments are merely intended to illustrate the present invention in detail and should by no means be considered to limit the scope of the invention.

Embodiment I

Figure 5:
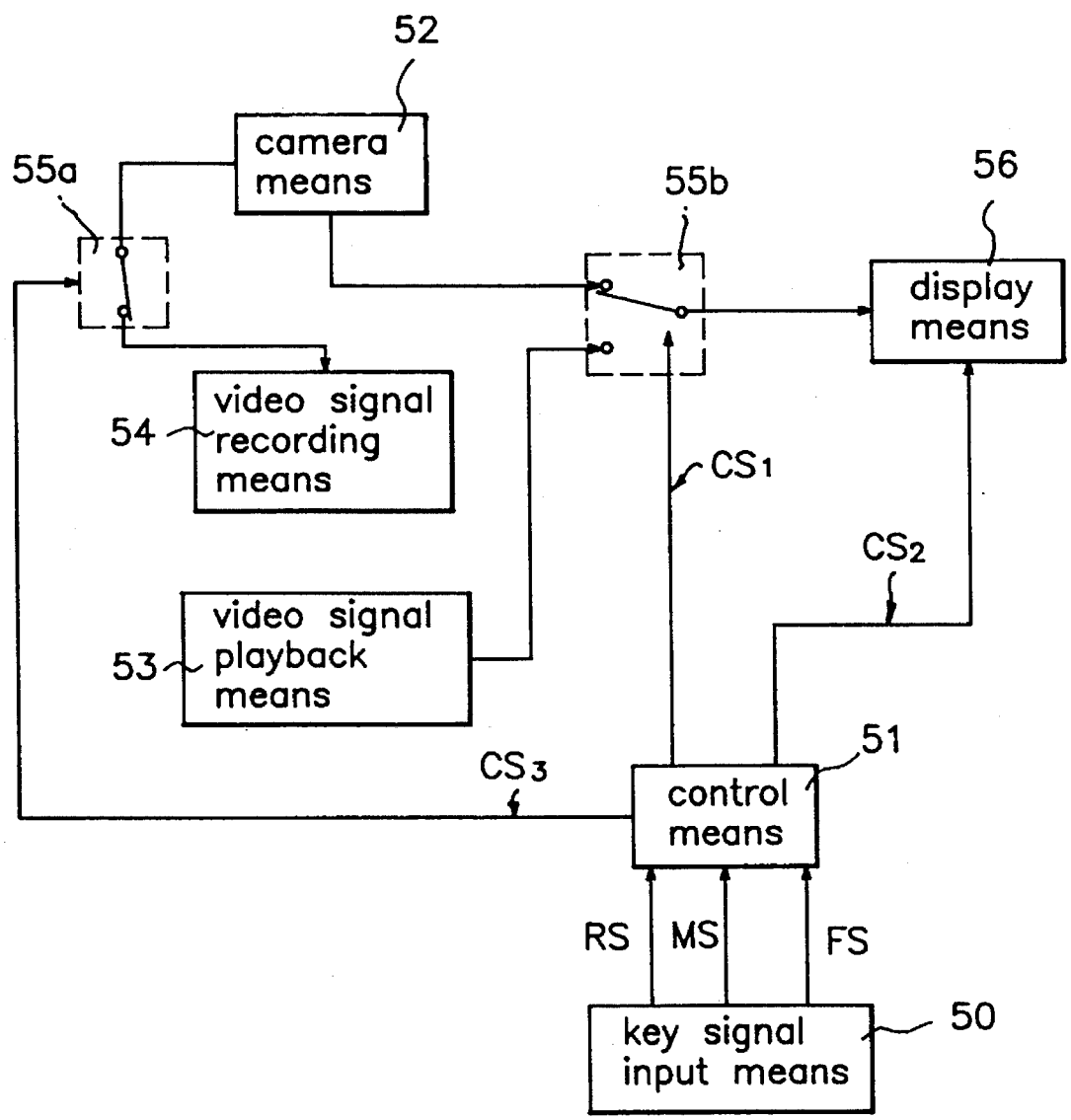
FIG. 5 is a block diagram of a movie camera system in accordance with a first embodiment of the present invention.

FIG. 5 is a block diagram showing a movie camera system in accordance with a first embodiment of the present invention. As shown in this figure, the movie camera system comprises camera means 52 for imaging an object and converting the resulting image into an analog composite video signal, video signal recording means 54 for recording the video signal from the camera means 52 on a VCR tape, video signal playback means 53 for playing back the video signal recorded on the VCR tape, and key signal input means 50 for providing a mode select signal MS for selecting one of the video signal from the camera means 52 and the video signal from the video signal playback means 53, a function select signal FS for selecting one of a view finding function and a projecting function and a recording select signal RS for selecting the recording of the video signal from the camera means 52, according to a user's selection.

The movie camera system also comprises control means 51 for generating a first control signal CS1 in response to the mode select signal MS from the key signal input means 50, a second control signal CS2 in response to the function select signal FS from the key signal input means 50 and a third control signal CS3 in response to the recording select signal RS from the key signal input means 50. The system further includes first switching means 55a responsive to the third control signal CS3 from the control means 51 for transferring the video signal from the camera means 52 to the video signal recording means 54, second switching means 55b responsive to the first control signal CS1 from the control means 51 for selectively transferring one of the video signal from the camera means 52 and the video signal from the video signal playback means 53, and display means 56 responsive to the second control signal CS2 from the control means 51 for view finding the video signal from the second switching means 55b thereon or for projecting the analog composite video signal on an external screen.

Figure 6A:
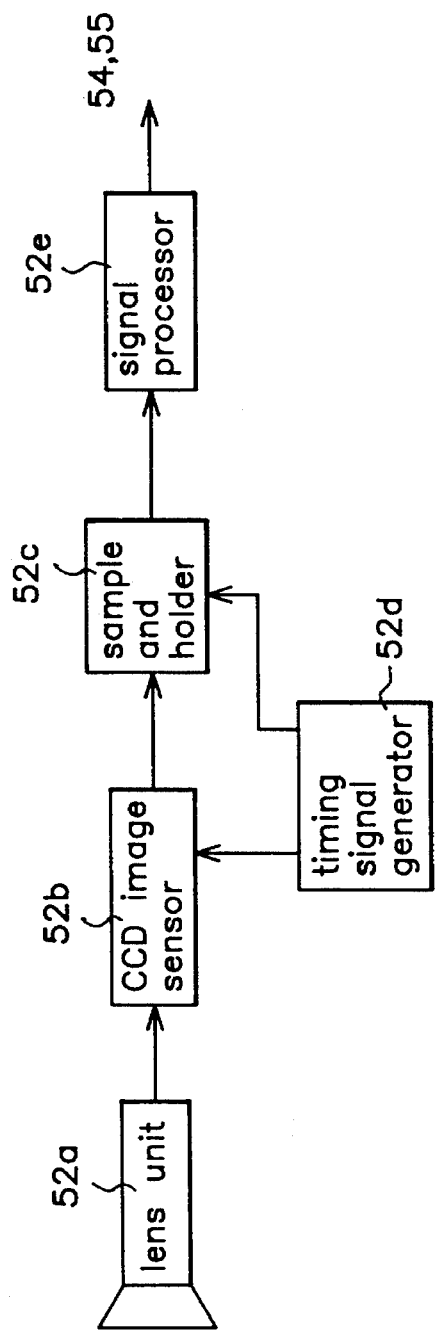
FIG. 6a is a block diagram of the camera means of FIG. 5 in accordance with the first embodiment of the present invention.

In FIG. 6a, there is shown a block diagram of the camera means 52 of FIG. 5 in accordance with the first embodiment of the present invention. As shown in FIG. 6a, the camera means 52 includes a lens unit 52a for receiving an optical image signal from the object, a charge coupled device (CCD) image sensor 52b for converting the optical image signal from the lens unit 52a into an electrical video signal, a sample and holder 52c for automatically controlling a gain of the video signal from the CCD image sensor 52b and sampling and holding the gain-controlled video signal, a timing signal generator 52d for generating a timing signal to synchronize the signal processes of the CCD image sensor 52b and the sample and holder 52c, and a signal processor 52e for processing the video signal from the sample and holder 52c to produce an analog composite video signal, the analog composite video signal comprising luminance and color signals Y and C.

Figure 7:
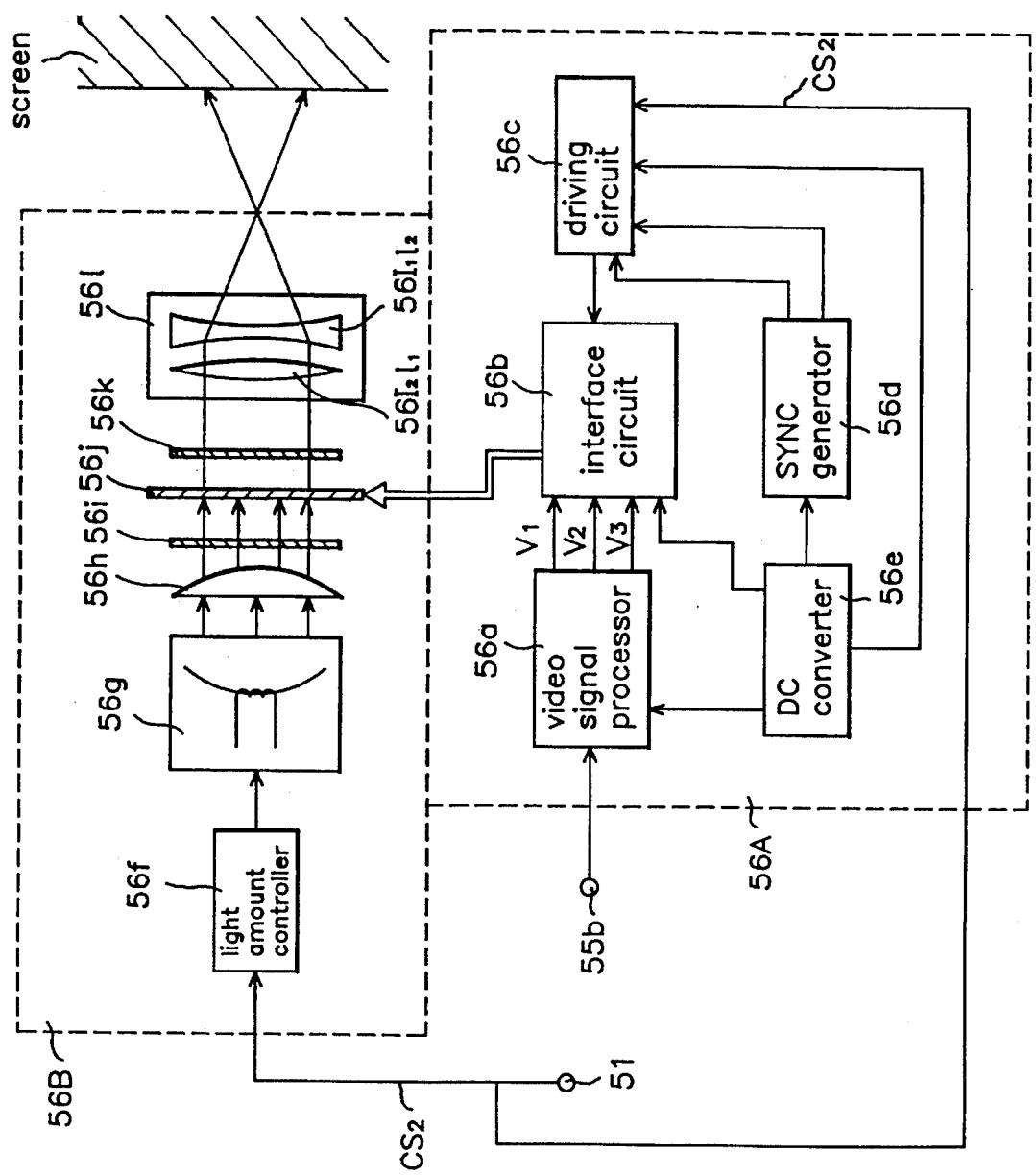
FIG. 7 is a block diagram of the display means of FIG. 5 in accordance with the first embodiment of the present invention.

FIG. 7 is a block diagram of the display means 56 of FIG. 5 in accordance with the first embodiment of the present invention. As shown in this figure, the display means 56 includes a video signal processor 56a for processing the video signal from the second switching means 55b so that it can be displayed, the processed video signals from the video signal processor 56a corresponding respectively to R, G and B color signals, an interface circuit 56b for sequentially providing the processed video signals from the video signal processor 56a to a liquid crystal display (LCD) device or panel 56j, a driving circuit 56c responsive to the second control signal CS2 from the control means 51 for changing arrangements of the video signals being provided from the interface circuit 56b to the LCD panel 56j, a synchronous signal generator 56d for outputting a plurality of vertical and horizontal synchronous signals to the driving circuit 56c to synchronize vertical and horizontal portions of the video signals of the changed arrangements, and a direct current (DC) converter 56e for supplying a DC power necessary to the components 56a, 56b, 56c and 56d in the display means 56.

The display means 56 also includes a light amount controller 56f responsive to the second control signal CS2 from the control means 51 for generating a control signal to control an amount of light, a light source 56g for generating the light of the amount controlled based on the control signal from the light amount controller 56f, a condensing lens 56h for condensing the light from the light source 56g, and a first polarizing plate 56i for polarizing the light from the condensing lens 56h. The LCD panel 56j is a matrix of pixels and lighted by the light from the first polarizing plate 56i, and displays the video signals from the interface circuit 56b.

The display means 56 also includes a second polarizing plate 56k for polarizing an optical image on the LCD panel 56j, the optical image resulting from the video signals displayed on the LCD panel 56j, and a focus lens unit 56i being controllably spaced from the LCD panel 56j to focus the optical image from the second polarizing plate 56k.

Figure 1:
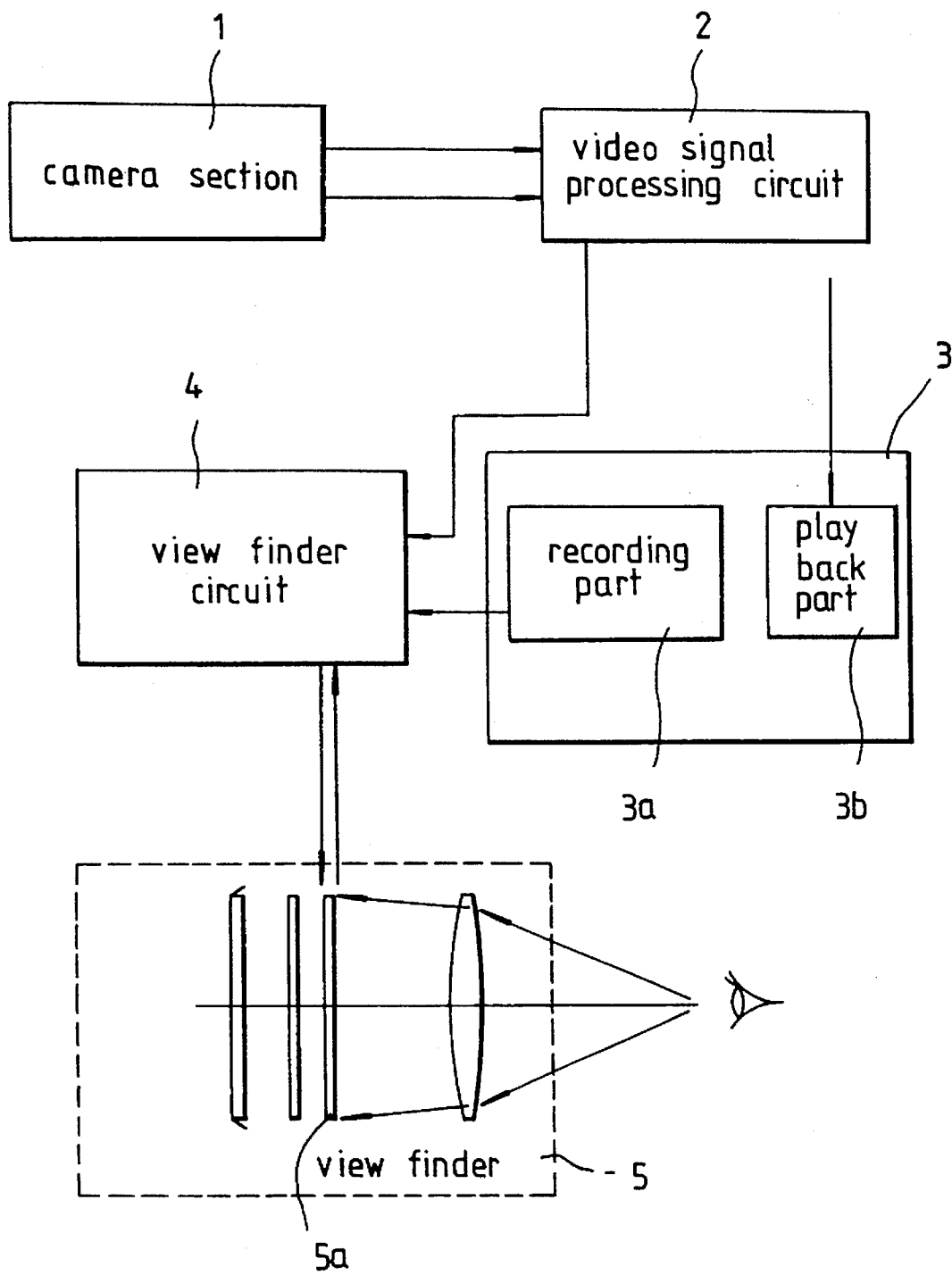
FIG. 1 is a schematic block diagram of a conventional movie camera system.
Figure 2A:
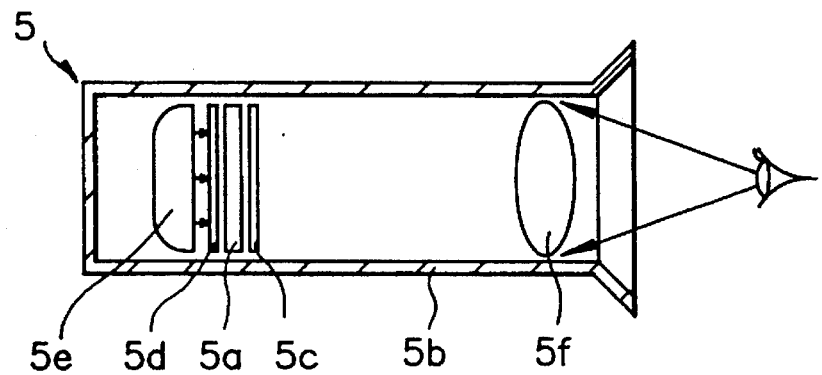
FIG. 2a is a schematic sectional view of the view finder of FIG. 1.
Figure 2B:
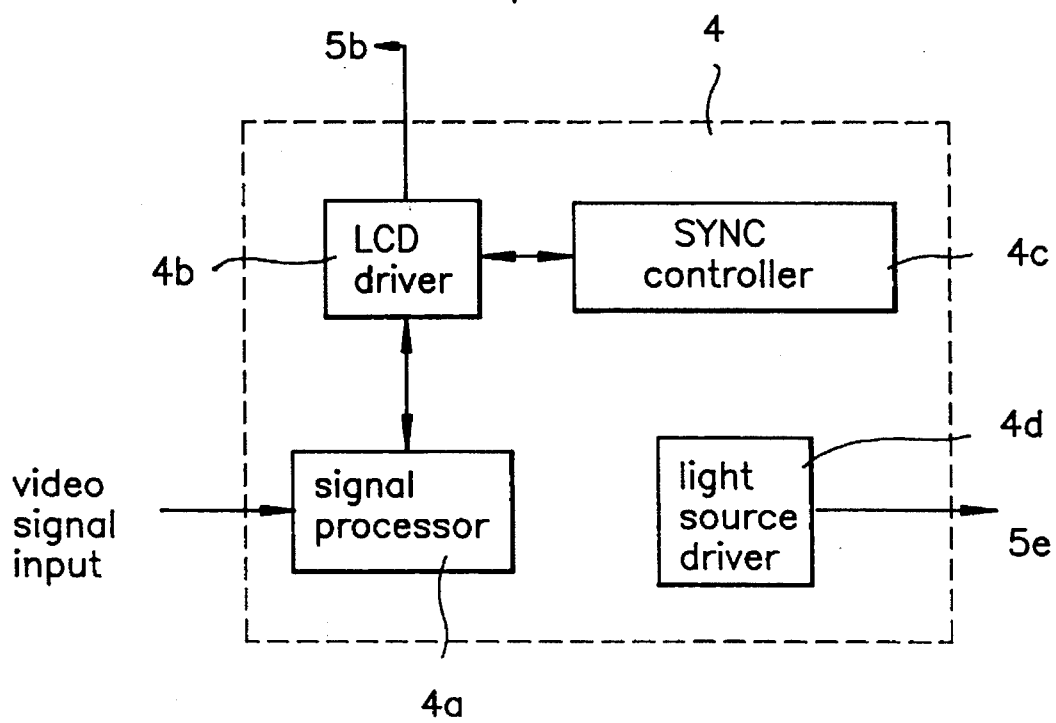
FIG. 2b is a schematic block diagram of the view finder circuit of FIG. 1.
Figure 3A:
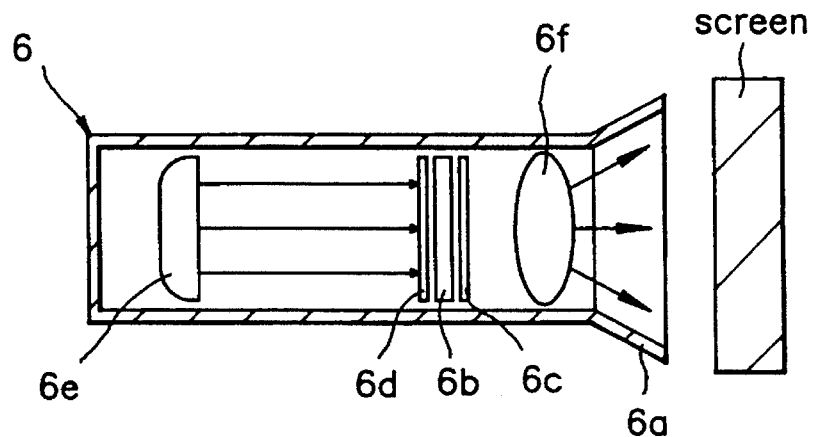
FIG. 3a is a schematic sectional view of a conventional projector.
Figure 3B:
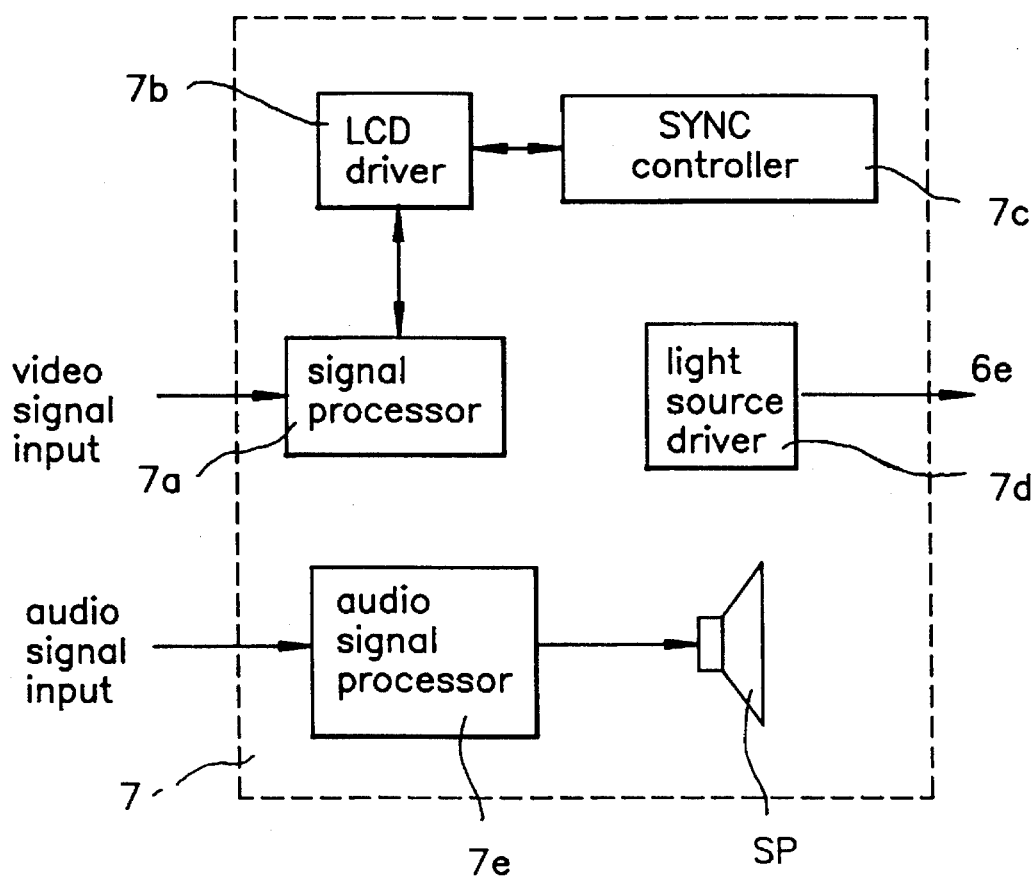
FIG. 3b is a schematic block diagram of a conventional projector circuit.

In FIG. 7, 56A and 56B designate a view finder circuit and a view finder, respectively, which correspond to the view finder circuit 4 and the view finder 5 of FIG. 1, but have constructions different therefrom. Also, although the LCD panel 56j is used as a display device, a modified CCD or luminescence element may be used for the display device.

The focus lens unit 56i is provided with a pair of focus lenses 5611 and 5612 adjustably spaced from each other to perform a zoom function for enlarging or reducing the image on the LCD panel 56j when it is projected on the external screen, as will be described later in detail.

Figure 9A:
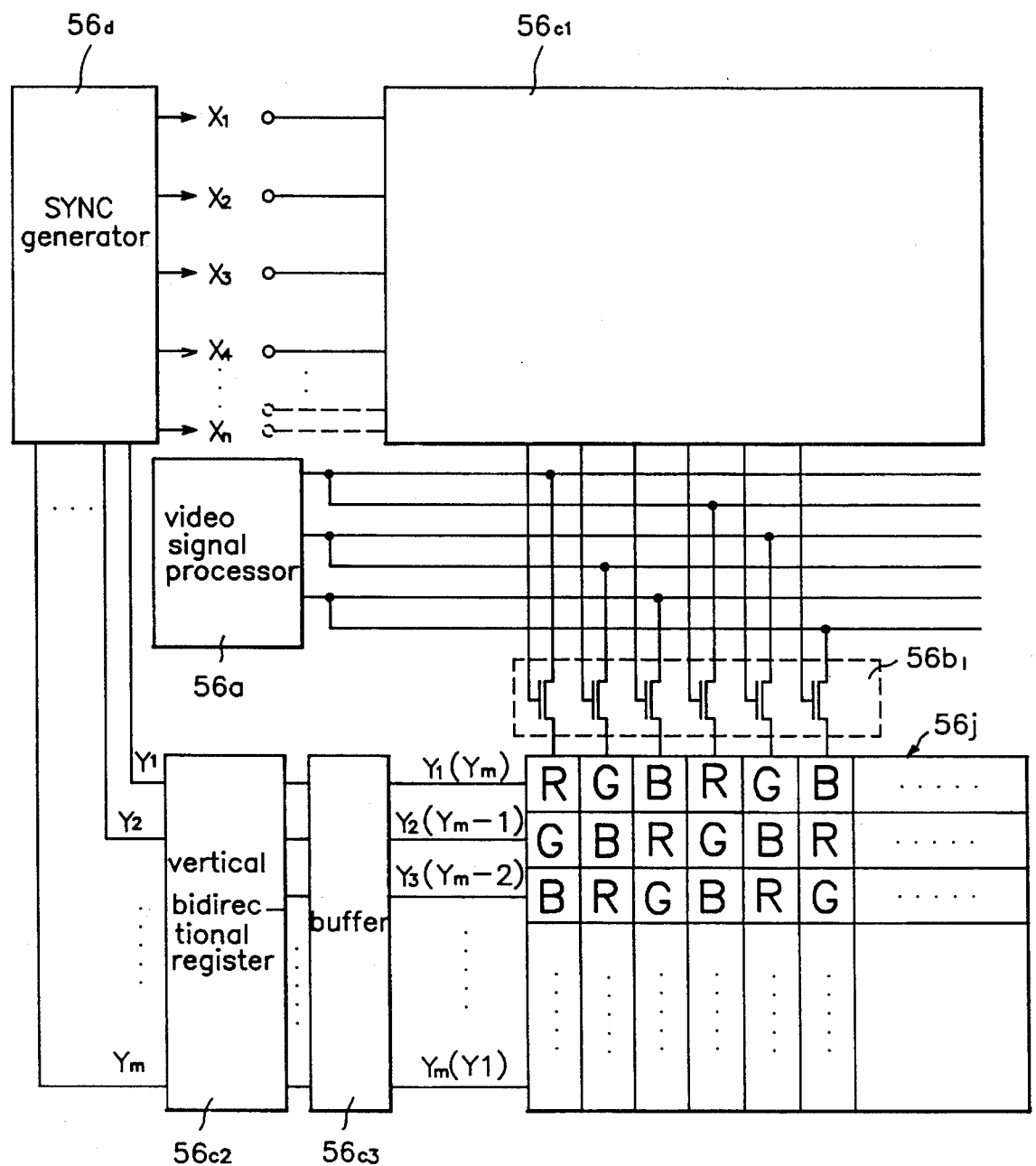
FIG. 9a is a detailed circuit diagram of the interface circuit and the driving circuit of FIG. 7 in accordance with the first embodiment of the present invention.

FIG. 9a shows a detailed circuit diagram of the interface circuit 56b and the driving circuit 56c of FIG. 7 in accordance with the first embodiment of the present invention. As shown in FIG. 9a, the driving circuit 56c includes a horizontal unidirectional register 56c1 for outputting the plurality of horizontal synchronous signals outputted by the synchronous signal generator 56d in an input order, a vertical bidirectional register 56c2 responsive to the second control signal CS2 from the control means 51 for outputting the plurality of vertical synchronous signals outputted by the synchronous signal generator 56d in an input order or a reverse order, and a buffer 56c3 for buffering the plurality of vertical synchronous signals from the vertical bidirectional register 56c2 and for outputting the buffered vertical synchronous signals in the input order as column drive signals to columns of the LCD panel 56j, downwardly beginning with an uppermost column, or the reverse order.

The interface circuit 56b includes a sample and holder 56b1 The sample and holder 56b1 is provided with a plurality of transistors, each having its source connected to a corresponding one of output terminals of the video signal processor 56a, its drain connected to the pixels of a corresponding one of rows of the LCD panel 56j and its gate connected to a corresponding one of output terminals of the horizontal unidirectional register 56c1 in the driving circuit 56c. The plurality of transistors are driven by the corresponding horizontal synchronous signals from the horizontal unidirectional register 56c1 to sequentially apply the R, G and B video signals in an input order, to the right beginning with the leftmost pixels of the columns of the LCD panel 56j being driven by the vertical synchronous signals from the buffer 56c3 in the driving circuit 56c.

Figure 9B:
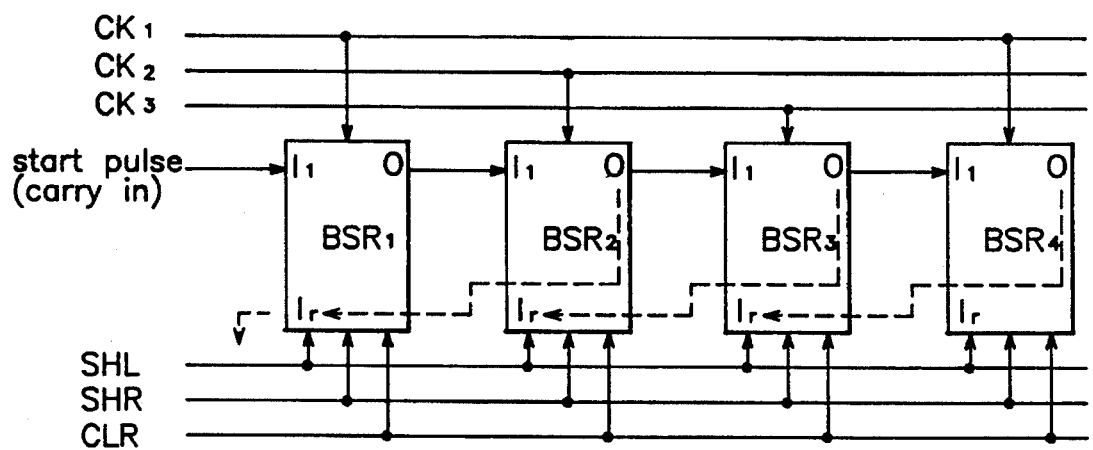
FIG. 9b is a schematic circuit diagram of the vertical bidirectional register of FIG. 9a in accordance with the first embodiment of the present invention.

FIG. 9b is a schematic circuit diagram of the vertical bidirectional register 56c2 of FIG. 9a in accordance with the first embodiment of the present invention. In FIG. 9b, SHL designates a control signal for shifting a signal to the left, SHR designates a control signal for shifting a signal to the right, and START PULSE (CARRY IN) designates a clock signal for indicating a start point of time that the video signal is displayed on the LCD panel 56j. Also, CK1, CK2 and CK3 designate shift clock signals, BSR1–BSR4 unit elements of the register 56c2 and CLR a clear signal, respectively.

Figure 9C:
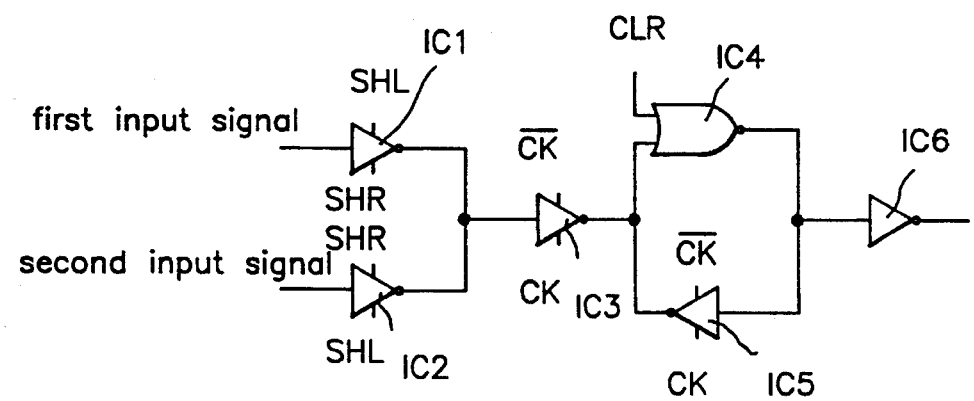
FIG. 9c is a detailed circuit diagram of an embodiment of a unit element in the vertical bidirectional register of FIG. 9b.

FIG. 9c is a detailed circuit diagram of an embodiment of the unit element in the vertical bidirectional register 56c2 of FIG. 9b. As shown in FIG. 9c, the unit element in the vertical bidirectional register 56c2 includes a first inverter gate IC1 for inverting a first input signal, a second inverter gate IC2 for inverting a second input signal, a third inverter gate IC3 for inverting output signals from the first and second inverter gates IC1 and IC2, a NOR gate IC4 for receiving an output signal from the third inverter gate IC3 at a first input and the clear signal CLR at a second input and for NORing the inputted signals, a fourth inverter gate IC5 for inverting an output signal from the NOR gate IC4, an output signal from the fourth inverter gate IC5 being applied to the first input of the NOR gate IC4 together with the output signal from the third inverter gate IC3, and a fifth inverter gate IC6 for inverting the output signal from the NOR gate IC4 and outputting the inverted signal as a final signal.

Figure 9D:
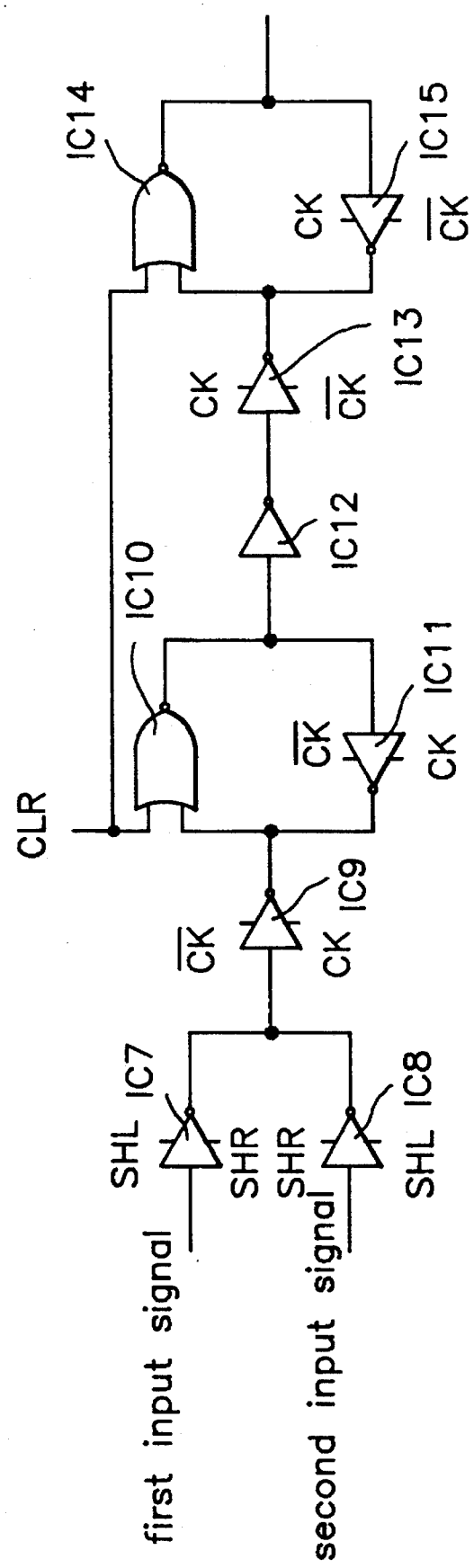
FIG. 9d is a detailed circuit diagram of an alternative embodiment of the unit element in the vertical bidirectional register of FIG. 9b.

FIG. 9d is a detailed circuit diagram of an alternative embodiment of the unit element in the vertical bidirectional register 56c2 of FIG. 9b. As shown in FIG. 9d, the unit element in the vertical bidirectional register 56c2 includes a first inverter gate IC7 for inverting a first input signal, a second inverter gate IC8 for inverting a second input signal, a third inverter gate IC9 for inverting output signals from the first and second inverter gates IC7 and IC8, a first NOR gate IC10 for receiving an output signal from the third inverter gate IC9 at a first input and the clear signal CLR at a second input and for NORing the inputted signals, and a fourth inverter gate IC11 for inverting an output signal form the first NOR gate IC10, an output signal from the fourth inverter gate IC11 being applied to the first input of the first NOR gate IC10 together with the output signal from the third inverter gate IC9.

The unit element in the vertical bidirectional register 56c2 also includes a fifth inverter gate IC12 for inverting the output signal from the first NOR gate IC10, a sixth inverter gate IC13 for inverting an output signal from the fifth inverter gate IC12, a second NOR gate IC14 for receiving an output signal from the sixth inverter gate IC13 at a first input and the clear signal CLR at a second input and for NORing the received signals to output a final signal, and a seventh invert gate IC15 for inverting an output signal from the second NOR gate IC14, an output signal from the seventh inverter gate IC15 being applied to the first input of the second NOR gate IC14 together with the output signal from the sixth inverter gate IC13.

The operation of the movie camera system with the above-mentioned construction in accordance with the first embodiment of the present invention will hereinafter be described in detail with reference to FIGS. 5 to 11.

First, the camera means 52 of FIG. 5 images an object and converts the resulting image into an analog composite video signal. Namely, as shown in FIG. 6a, the lens unit 52a receives an optical image signal from the framed object and the CCD image sensor 52b converts the optical image signal from the lens unit 52a into a electrical video signal. The sample and holder 52c automatically controls a gain of the video signal from the CCD image sensor 52b and samples and holds the gain-controlled video signal. At this time, the sample and holder 52c has to perform the sampling and holding operation for a frame of the video signal because the CCD image sensor 52b processes the video signal on a per frame basis. The timing signal generator 52d generates the timing signal to synchronize the signal processes of the CCD image sensor 52b and the sample and holder 52c. The timing signal from the timing signal generator 52d is applied to both the CCD image sensor 52b and the sample and holder 52c. It is noted herein that it is required to separate the luminance and color signals Y and C from the video signal, for the process of the video signal in the movie camera system. For this reason, the signal processor 52e processes the video signal from the sample and holder 52c to produce an analog composite video signal comprised of the luminance and color signals Y and C, the color signal C containing three color signals, namely, red (R), green (G) and blue (B) signals.

The output signal from the camera means 52 is applied via the first switching means 55a to the video signal recording means 54 upon generation of the third control signal CS3 from the control means 51. Upon receiving the output signal from the camera means 52, the video signal recording means 54 records the received signal on the VCR tape.

The output signal from the camera means 52 is also applied to one input of the second switching means 55b, the other input of which is applied with the video signal on the VCR tape which is played back by the video signal playback means 53. Upon generation of the first control signal CS1 from the control means 51, the second switching means 55b selects one of the video signal from the camera means 52 and the video signal from the video signal playback means 53 and applies the selected video signal to the display means 56.

As shown in FIG. 7, the video signal processor 56a in the display means 56 processes the video signal from the second switching means 55b so that it can be displayed. As a result, the video signal processor 56a sequentially generates three video signals V1, V2 and V3 corresponding respectively to the R, G and B color signals every pixel. The sequential video signals V1, V2 and V3 from the video signal processor 56a are applied to the interface circuit 56b, as shown in FIG. 9a.

Provided that the second control signal CS2 is generated from the control means 51 for the view finding function, the sequential video signals V1, V2 and V3 from the video signal processor 56a are sequentially applied to the sources of the transistors of the sample and holder 56b1 in the interface circuit 56b, and the horizontal unidirectional register 56c1 in the driving circuit 56c outputs n horizontal synchronous signals X1, X2, . . . , Xn from the synchronous signal generator 56d in an input order and at a fixed time lag. The horizontal synchronous signals from the horizontal unidirectional register 56c1 are applied as drive signals to the gates of the transistors of the sample and holder 56b1 in the interface circuit 56b.

Also, the vertical bidirectional register 56c2 in the driving circuit 56c outputs m vertical synchronous signals Y1, Y2, ..., Ym from the synchronous signal generator 56d in an input order. Then, the buffer 56c3 in the driving circuit 56c buffers the vertical synchronous signals from the vertical bidirectional register 56c2 and outputs the buffered vertical synchronous signals in an input order as the column drive signals to the columns of the LCD panel 56j, downwardly beginning with an uppermost column.

Thin film transistors (TFTs) are formed at the bottom of the LCD panel 56j to drive the corresponding pixels. As a result, when a vertical synchronous signal Y is applied, all the pixels of the corresponding column are driven by the thin film transistors being supplied with the vertical synchronous signal Y, thereby to receive the video signals.

As a result, the columns of the LCD panel 56j are sequentially driven downwardly beginning with an uppermost column by the vertical synchronous signals Y1, Y2, ..., Ym and the transistors of the sample and holder 56b1 are sequentially turned on to the right beginning with the leftmost transistor by the horizontal synchronous signals X1, X2, ..., Xn, thereby causing the sequential video signals V1, V2 and V3 from the video signal processor 56a to be applied to the LCD panel 56j downwardly beginning with an uppermost column in the vertical direction and to the right beginning with the leftmost pixel in the horizontal direction.

On the other hand, provided that the second control signal CS2 is generated from the control means 51 for the projecting function, the video signals being displayed on the LCD panel 56j must be arranged in an upside-down symmetrical relationship to those for the view finding process. Namely, the video signals for the view finding process must be inverted for the projecting process. This results in a correct image being projected on the external screen, as stated previously in conjunction with FIGS. 4a through 4c.

In this case, the vertical bidirectional register 56c2 in the driving circuit 56c outputs the m vertical synchronous signals Y1, Y2, ..., Ym from the synchronous signal generator 56d in reverse of an input order. Then, the buffer 56c3 in the driving circuit 56c buffers the vertical synchronous signals Ym, Ym-1, ..., Y1 from the vertical bidirectional register 56c2 and outputs the buffered vertical synchronous signals in an input order as the column drive signals to the columns of the LCD panel 56j, upwardly beginning with the lowermost column. As a result, the columns of the LCD panel 56j are sequentially driven upwardly beginning with the lowermost column.

As a result, the sequential video signals V1, V2 and V3 from the video signal processor 56a are applied through the drains of the transistors in the sample and holder 56b1 to the LCD panel 56j upwardly beginning with the lowermost column in the vertical direction and to the right beginning with the leftmost pixel in the horizontal direction in the same manner as those in the view finding process. At this time, the video signals displayed on the LCD panel 56j appear in an upside-down symmetrical relationship to those in the view finding process.

Turning again to FIG. 7, the DC converter 56e supplies the necessary DC power to the components 56a–56d in the display means 56. The light amount controller 56f is operative in response to the second control signal CS2 from the control means 51 so that it generates a control signal to control an amount of light from the light source 56g. Namely, when the second control signal CS2 is generated from the control means 51 for the view finding function, the light amount controller 56f controls the light source 56g so that a small amount of light is generated therefrom. When the second control signal CS2 is generated from the control means 51 for the projecting function, the light amount controller 56f controls the light source 56g so that a large amount of light is generated therefrom. The light from the light source 56g is applied toward the rear of the LCD panel 56j through the condensing lens 56h and the first polarizing plate 56i. Therefore, the user can view the image on the LCD panel 56j through the focus lens unit 561 and the second polarizing plate 56k when the view finding function is performed by the display means 56. In this case, the focus lens unit 561 is used as a typical eye lens.

On the other hand, in the case where the projecting function is performed by the display means 56, a large amount of light from the light source 56g is applied toward the rear of the LCD panel 56j through the condensing lens 56h and the first polarizing plate 56i. As a result, the image on the LCD panel 56j is projected on the external screen through the second polarizing plate 56k and the focus lens unit 561 by the large amount of light from the light source 56g.

Figure 8A:
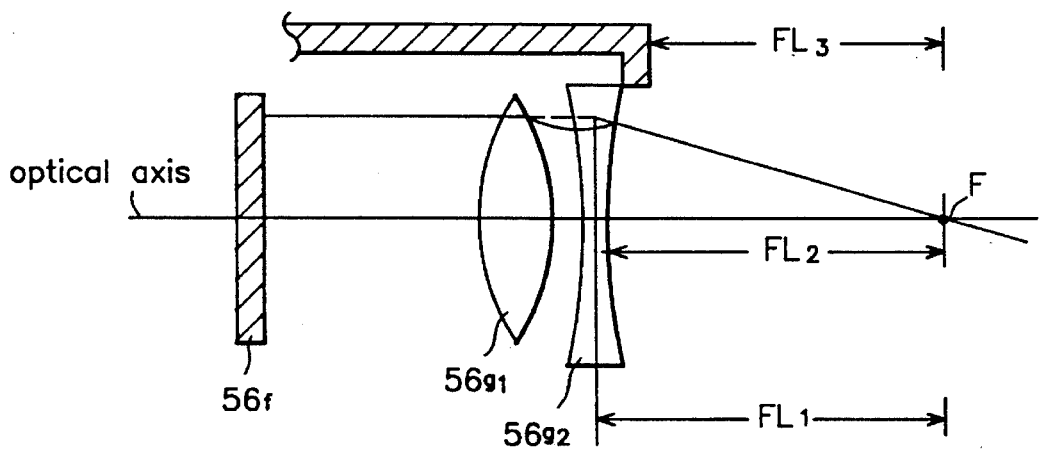
FIG. 8a is a view illustrating focal lengths of the focus lens unit of FIG. 7.
Figure 8B:
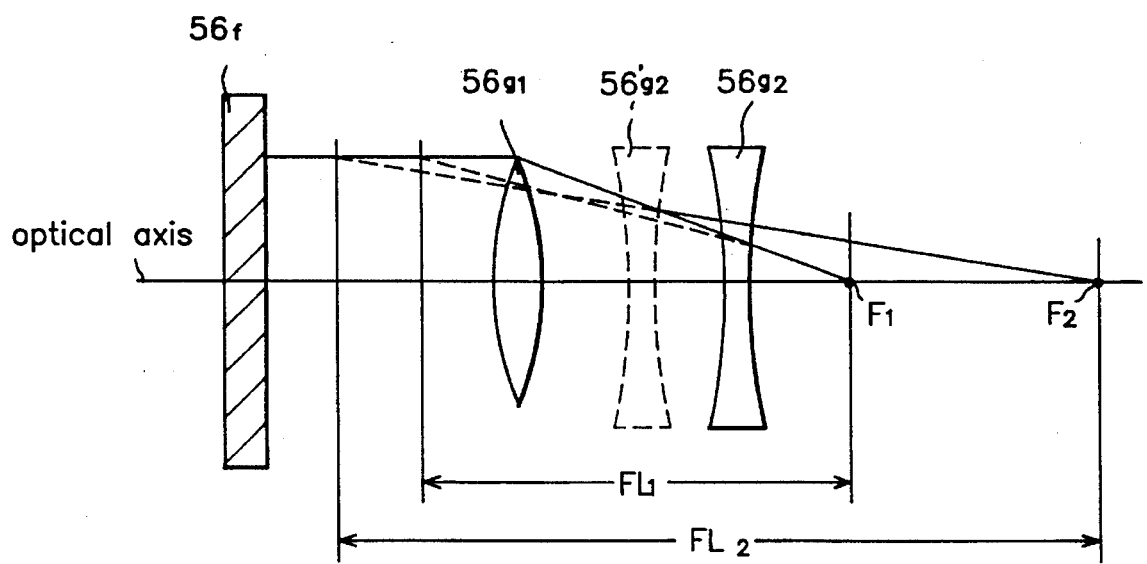
FIG. 8b is a view illustrating a zoom function of the focus lens unit of FIG. 7.

The focus lens unit 561 is adjustably spaced from the LCD panel 56j to focus the image being projected on the external screen. FIG. 8a illustrates examples of focal length FL which are practically used. Generally, a focal length FL1 is most frequently used among three focal lengths FL1, FL2 and FL3. Also as shown in FIG. 7, the focus lens unit 561 is provided with the pair of focus lenses 5611 and 5612. The focus lenses 5611 and 5612 are adjustably spaced from each other to perform the zoom function for enlarging or reducing the image on the LCD panel 56j when it is projected on the external screen. In FIG. 8b, the focal length is FL1 when the second focus lens 5612 is positioned as indicated by a solid line and FL2 when the second focus lens 5612 is positioned as indicated by a dotted line. For this reason, a long distance between the first and second focus lenses 5611 and 5612 causes the projected image to be seen as if it were near. Also, a short distance between the first and second focus lenses 5611 and 5612 causes the projected image to be seen as if it were far away.

Figure 10:
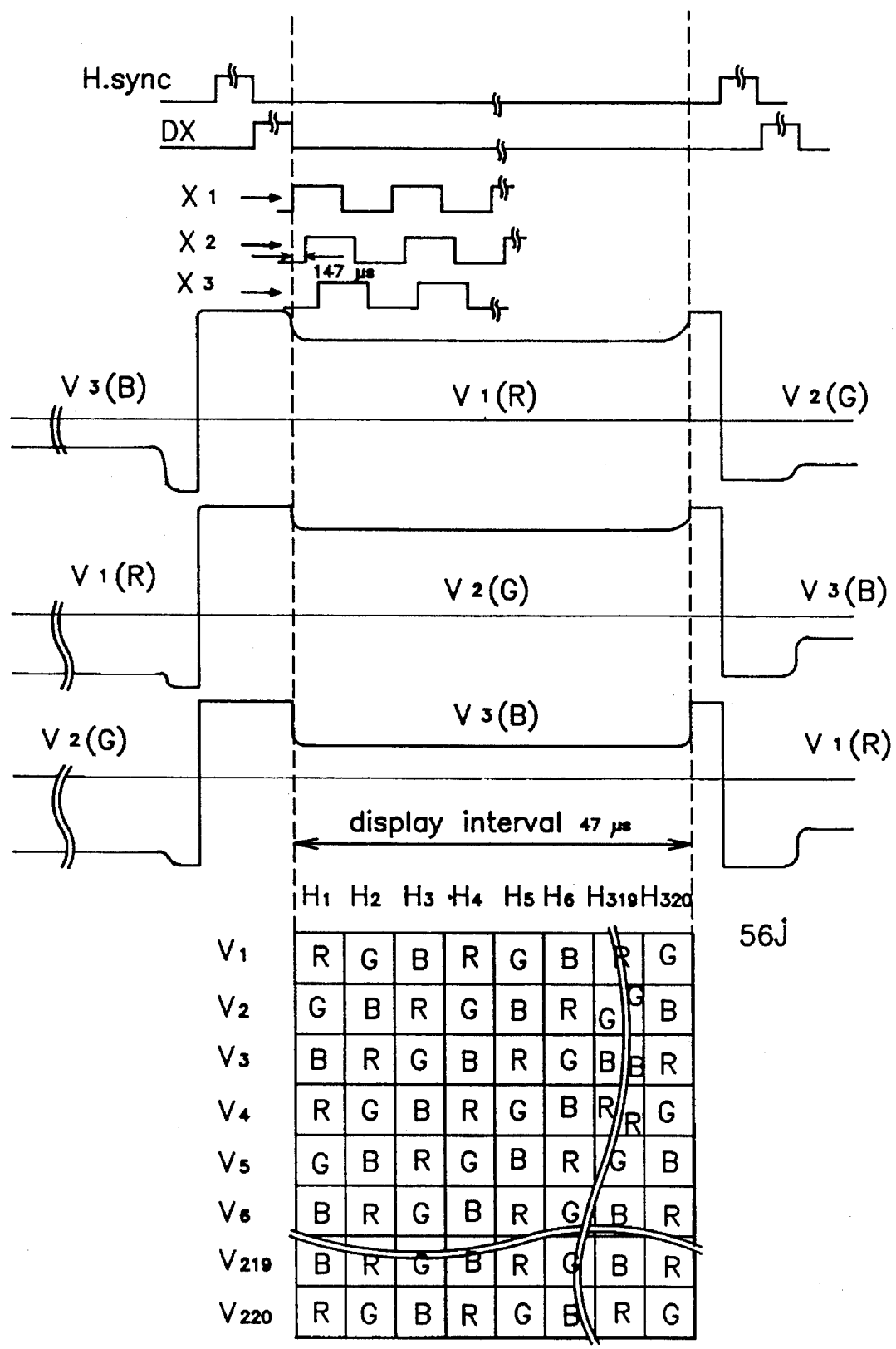
FIG. 10 is a timing diagram of video signals being applied to an LCD panel in a horizontal direction by horizontal synchronous signals.

In FIG. 10, there is shown a timing diagram of the video signals V1, V2 and V3 from the video signal processor 56a being applied to the LCD panel 56j in the horizontal direction by the horizontal synchronous signals X1, X2, ..., Xn from the synchronous signal generator 56d. The sequential video signals V1, V2 and V3 corresponding respectively to the R, G and B color signals are sequentially applied to the pixels of the columns of the LCD panel 56j in the horizontal direction by the horizontal synchronous signals X1, X2, ..., Xn from the synchronous signal generator 56d. In this figure, Hsync designates a column synchronous signal, DX a column synchronization delay signal and H1-H320 the number of the pixels of the column, respectively. The column synchronous signal Hsync is generated from the synchronous signal generator 56d once whenever n horizontal synchronous signals are generated therefrom. In accordance with the preferred embodiment of the present invention, 47 μsec is required in displaying the video signals on the 320 pixels.

Figure 11:
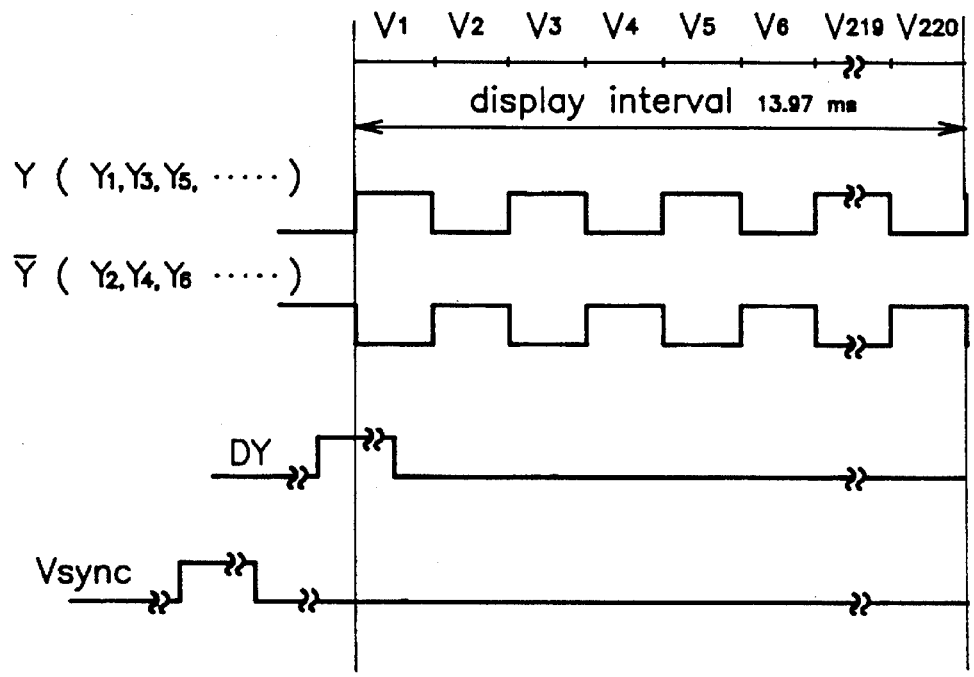
FIG. 11 is a timing diagram of vertical synchronous signals being applied to an LCD panel in a vertical direction.

In FIG. 11, there is shown a timing diagram of the vertical synchronous signals outputted by the synchronous signal generator 56d being applied to the LCD panel 56j in the vertical direction. The vertical synchronous signals Y1, Y2, ..., Ym from the synchronous signal generator 56d are sequentially applied to the rows V1-V220 of the LCD panel 56j. In this figure, Vsync designates a row synchronous signal, DY a row synchronization delay signal and V1–V220 the number of the pixels of the row, respectively. In accordance with the preferred embodiment of the present invention, 13.97 msec is required in displaying the video signals on the 220 pixels. The row synchronous signal Vsync is generated from the synchronous signal generator 56d for a frame unit.

Embodiment II

In a second embodiment of the present invention, a frame memory is employed for use in changing the arrangements of the video signals so that the video signals are suitable to the projecting function or the view finding function. The video signals are stored in the frame memory and outputted therefrom, with the arrangements being changed. Such a technique utilizing the frame memory is presently in use in movie camera systems. This technique is well known in the art, and a detailed description thereof will thus be omitted.

The second embodiment of the present invention is applied particularly to the camera section in the movie camera system. In this embodiment, R, G and B video signals from the camera section are stored in the frame memory and outputted therefrom, with the arrangements being changed in accordance with a control signal for the projecting process.

Figure 12:
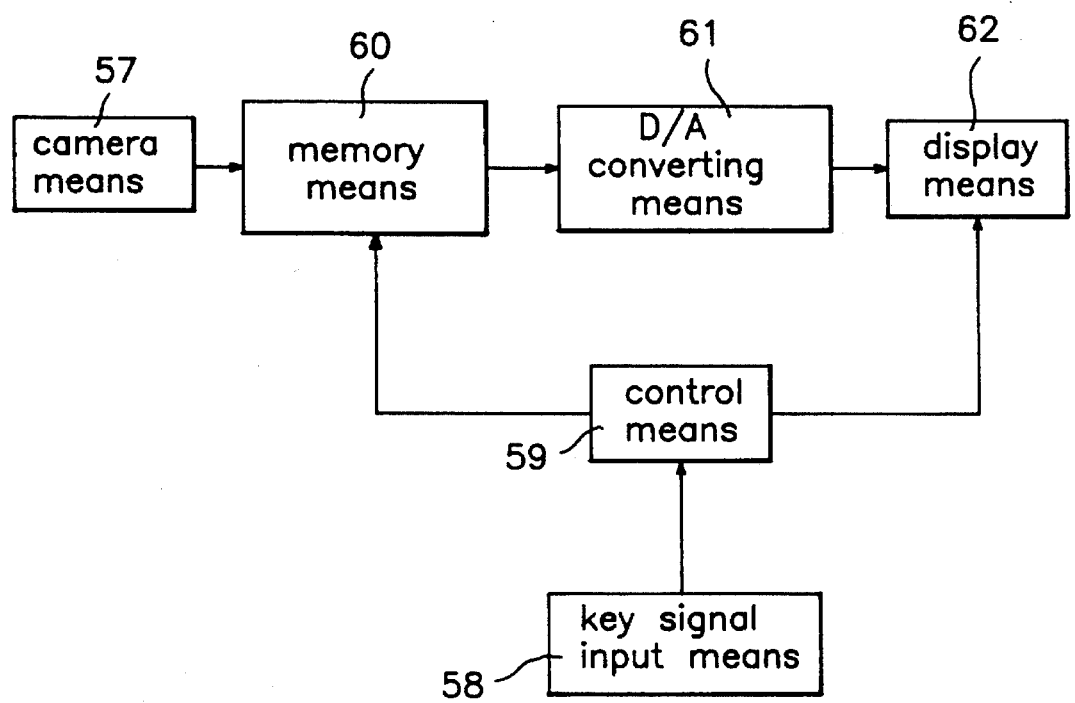
FIG. 12 is a block diagram of a movie camera system in accordance with the second embodiment of the present invention.

FIG. 12 is a block diagram of a movie camera system in accordance with the second embodiment of the present invention. As shown in this figure, the movie camera system comprises camera means 57 for imaging an object and converting the resulting image into a digital composite video signal, key signal input means 58 for providing a function select signal for selecting one of a view finding function and a projecting function, and control means 59 responsive to the function select signal from the key signal input means 58 for generating a control signal.

The movie camera system also comprises memory means 60 for storing the digital composite video signal from the camera means 57, for changing an arrangement of the stored digital composite video signal suitably to the view finding function or the projecting function in response to the control signal from the control means 59 and outputting the digital composite video signal having the changed arrangement, digital/analog (D/A) converting means 61 for converting the digital composite video signal outputted by the memory means 60 into an analog composite video signal, and display means 62 responsive to the control signal from the control means 59 for view finding the analog composite video signal from the D/A converting means 61 thereon or projecting it onto an external screen.

Figure 6B:
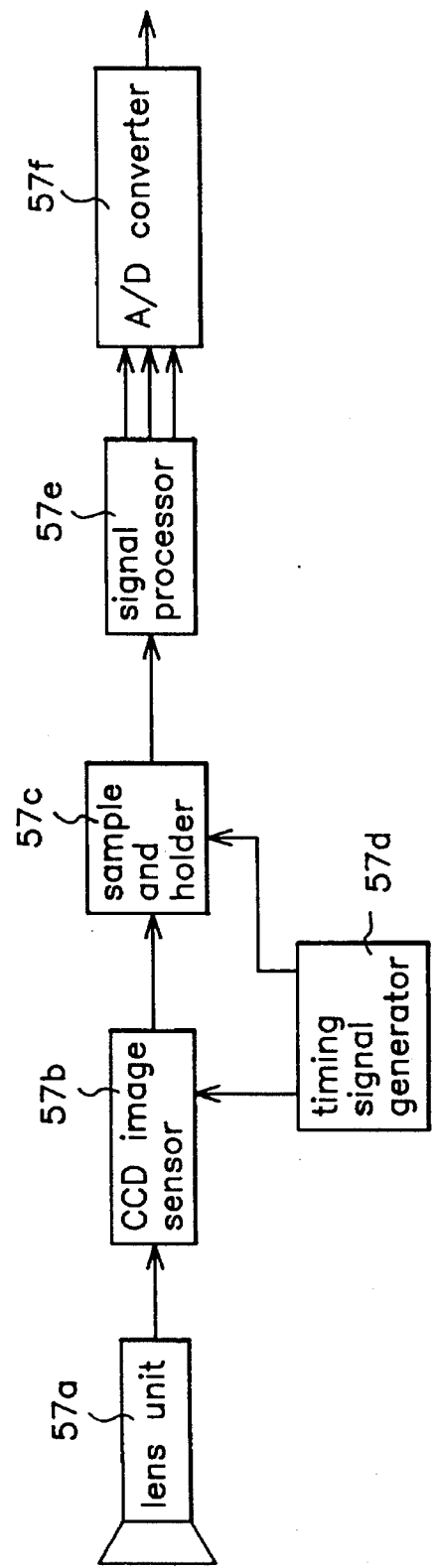
FIG. 6b is a block diagram of the camera means in accordance with a second embodiment of the present invention.

In FIG. 6b, there is shown a block diagram of the camera means 57 of FIG. 12 in accordance with the second embodiment of the present invention. As shown in FIG. 6b, the camera means 57 includes a lens unit 57a for receiving an optical image signal from the object, a CCD image sensor 57b for converting the optical image signal from the lens unit 57a into an electrical video signal, a sample and holder 57c for automatically controlling a gain of the video signal from the CCD image sensor 57b and sampling and holding the gain-controlled video signal, a timing signal generator 57d for generating a timing signal to synchronize the signal processes of the CCD image sensor 57b and the sample and holder 57c, and a signal processor or a matrix circuit 57e for processing the video signal from the sample and holder 52c to produce an analog composite video signal, the analog composite video signal comprising luminance and color signals Y and C, the color signal C containing three color signals, namely, red (R), green (G) and blue (B) signals.

The camera means 57 also includes an A/D converter 57f for converting the analog composite video signal from the signal processor 57e into the digital composite video signal.

Figure 13:
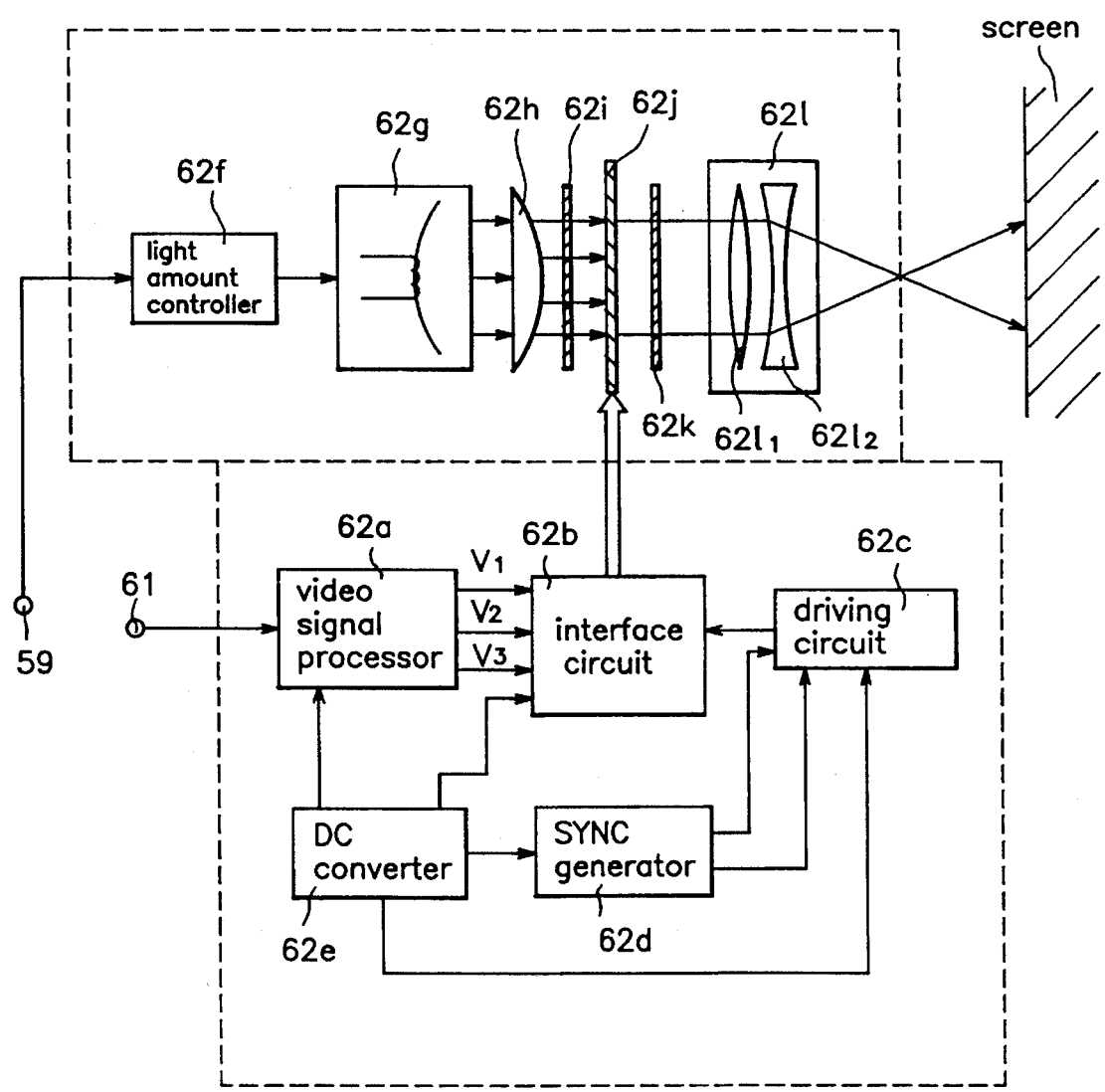
FIG. 13 is a block diagram of the display means of FIG. 12 in accordance with the second embodiment of the present invention.

In FIG. 13, there is shown a block diagram of the display means 62 of FIG. 12 in accordance with the second embodiment of the present invention. As shown in FIG. 13, the display means 62 includes a video signal processor 62a for processing the video signal from the D/A converting means 61 so that it can be displayed, the processed video signals from the video signal processor 62a corresponding respectively to the R, G and B color signals, an interface circuit 62b for sequentially providing the processed video signals from the video signal processor 62a to an LCD device or panel 62j, a driving circuit 62c for driving the interface circuit 62b and the LCD panel 62j so that the processed video signals from the video signal processor 62a can be applied sequentially through the interface circuit 6b to the LCD panel 62j, a synchronous signal generator 62d for outputting a plurality of vertical and horizontal synchronous signals to the driving circuit 62c to synchronize vertical and horizontal portions of the video signals being applied to the LCD panel 62j, and a DC converter 62e for supplying the necessary DC power to the components 62a, 62b, 62c and 6d in the display means 62.

The display means 62 also includes a light amount controller 62f responsive to the control signal from the control means 59 for generating a control signal to control an amount of light, a light source 62g for generating the light of the amount controlled based on the control signal from the light amount controller 62f, a condensing lens 62h for condensing the light from the light source 62g, and a first polarizing plate 62i for polarizing the light from the condensing lens 62h. The LCD panel 62j is a matrix of pixels and lighted by the light from the first polarizing plate 62i, and displays the video signals from the interface circuit 62b.

The display means 62 also includes a second polarizing plate 62k for polarizing an optical image on the LCD panel 62j, the optical image resulting from the video signals displayed on the LCD panel 62j, and a focus lens unit 621 being adjustably spaced from the LCD panel 62J to focus the optical image from the second polarizing plate 62k.

In FIG. 13, the focus lens unit 621 is provided with a pair of focus lenses 6211 and 6212. The focus lenses 6211 and 6212 are adjustably spaced from each other to perform a zoom function for enlarging or reducing the image on the LCD panel 62j when it is projected on the external screen.

Figure 14:
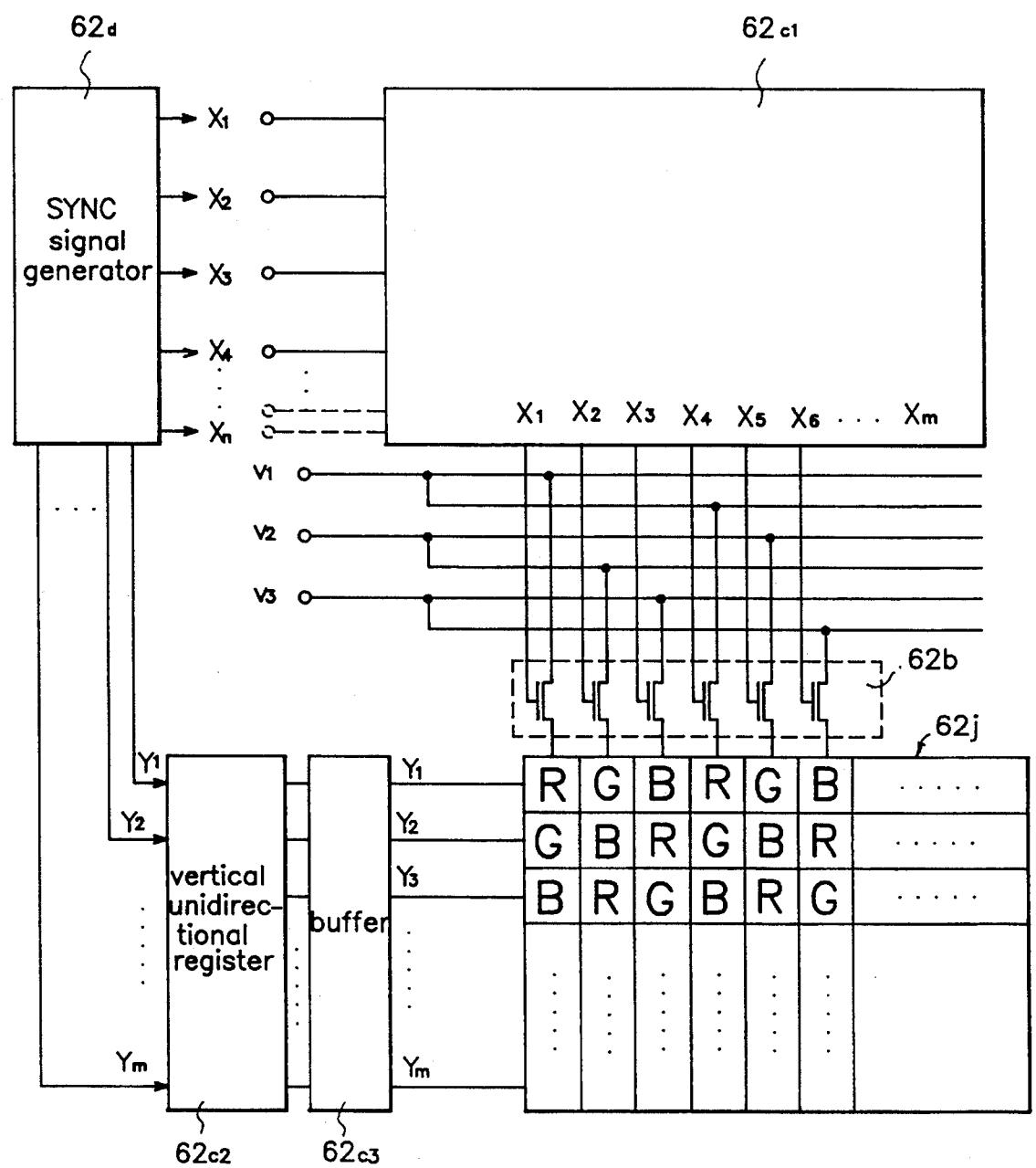
FIG. 14 is a detailed circuit diagram of the interface circuit and the driving circuit of FIG. 13 in accordance with the second embodiment of the present invention.

FIG. 14 shows a detailed circuit diagram of the interface circuit 62b and the driving circuit 62c of FIG. 13 in accordance with the second embodiment of the present invention. As shown in FIG. 14, the driving circuit 62c includes a horizontal unidirectional register 62c1 for outputting the plurality of horizontal synchronous signals outputted by the synchronous signal generator 62d in an input order, a vertical unidirectional register 62c2 for outputting the plurality of vertical synchronous signals outputted by the synchronous signal generator 62d in an input order, and a buffer 62c3 for buffering the plurality of vertical synchronous signals outputted by the vertical unidirectional register 62c2 and for outputting the buffered vertical synchronous signals in the input order as column drive signals to columns of the LCD panel 62j, downwardly beginning with an uppermost column.

The interface circuit 62b includes a sample and holder 62b1. The sample and holder 62b1 is provided with a plurality of transistors, each having its source connected to a corresponding one of output terminals of the video signal processor 62a, its drain connected to the pixels of a corresponding one of rows of the LCD panel 62j and its gate connected to a corresponding one of output terminals of the horizontal unidirectional register 62c1 in the driving circuit 62c. The plurality of transistors are driven by the corresponding horizontal synchronous signals from the horizontal unidirectional register 62c1 to sequentially apply the R, G and B video signals in an input order, to the right beginning with the leftmost pixels of the columns of the LCD panel 62j being driven by the vertical synchronous signals from the buffer 62c3 in the driving circuit 62c.

In FIG. 12, the memory means 60 includes a frame memory for storing one frame of the video signal from the camera means 57.

The construction of the second embodiment is similar to that of the first embodiment, but the operation thereof is somewhat different from that of the first embodiment. The major difference is that the change of the arrangements of the video signals is performed by the memory means 60 in the second embodiment instead of by the display means 56 in the first embodiment. This enables the constructions of the driving circuit 62c and the interface circuit 62b to be simplified, as shown in FIG. 14. For example, the driving circuit 62c includes the vertical unidirectional register 62c2 instead of the vertical bidirectional register 52c2 as compared with the first embodiment in FIG. 9a. Further, the wiring is simplified as mentioned above.

On the other hand, in the second embodiment as shown in FIG. 12, the D/A converting means is added to convert the video signal from the memory means 60 into the analog signal so that it can be displayed on the LCD panel 62j, since the signal process is performed in a digital form in the memory means 60.

In the second embodiment, the display of the sequential video signals V1, V2 and V3 from the video signal processor 62a on the LCD panel 62j is the same as that in the first embodiment, and a description thereof will thus be omitted. Furthermore, the construction and operation of the second embodiment are substantially the same as those of the first embodiment, except the above-mentioned differences, and a description thereof will thus be omitted.

Embodiment III

In a third embodiment of the present invention, a frame memory is employed for use in changing the arrangements of the video signals so that the video signals are suitable to the projecting function or the view finding function, in the same manner as that in the second embodiment. The third embodiment of the present invention applies particularly to the VCR section in the movie camera system, contrary to the second embodiment which applies particularly to the camera section in the movie camera system. It is common that a frame memory is employed in a VCR, particularly a SUPER-VHS type of VCR, for use in obtaining high quality video pictures in change speed playback and still operations of the VCR.

Figure 15:
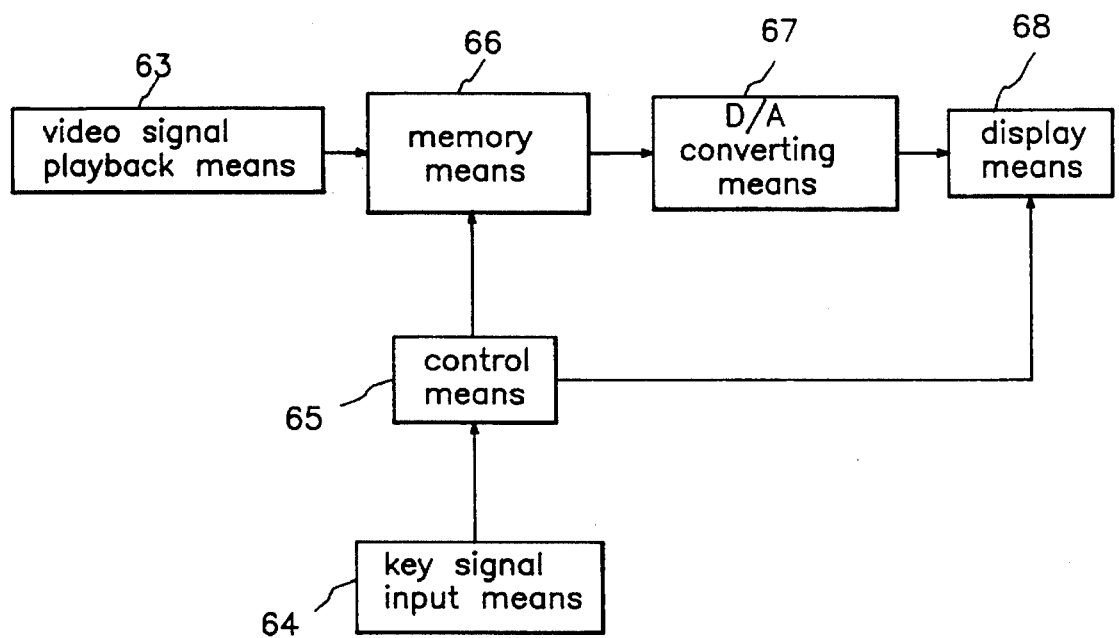
FIG. 15 is a block diagram of a movie camera system in accordance with a third embodiment of the present invention.

In FIG. 15, there is shown a block diagram of a movie camera system in accordance with the third embodiment of the present invention. As shown in that figure, the movie camera system comprises video signal playback means 63 for playing back a composite video signal recorded on a VCR tape in a digital form, key signal input means 64 for providing a function select signal for selecting one of a view finding function and a projecting function, and control means 65 responsive to the function select signal from the key signal input means 64 for generating a control signal.

The movie camera system also comprises memory means 66 for storing the digital composite video signal from the video signal playback means 63, for changing an arrangement of the stored digital composite video signal suitably to the view finding function or to the projecting function in response to the control signal from the control means 65 and outputting the digital composite video signal having the changed arrangement, D/A converting means 67 for converting the digital composite video signal outputted by the memory means 66 into an analog composite video signal, and display means 68 responsive to the control signal from the control means 65 for view finding the analog composite video signal from the D/A converting means 67 thereon or for projecting the analog composite video signal on an external screen.

The detailed construction and operation of the third embodiment are substantially the same as those of the second embodiment, and a description thereof will thus be omitted.

Embodiment IV

In a fourth embodiment of the present invention, a frame memory is employed for use in changing the arrangements of the video signals so that the video signals are suitable for the projecting function or for the view finding function, in the same manner as those in the second and third embodiments. The fourth embodiment of the present invention is not limited to movie camera systems, but applies to all systems which output analog composite video signals, contrary to the second and third embodiments which apply particularly to the camera section and VCR section in the movie camera system, respectively.

Figure 16:
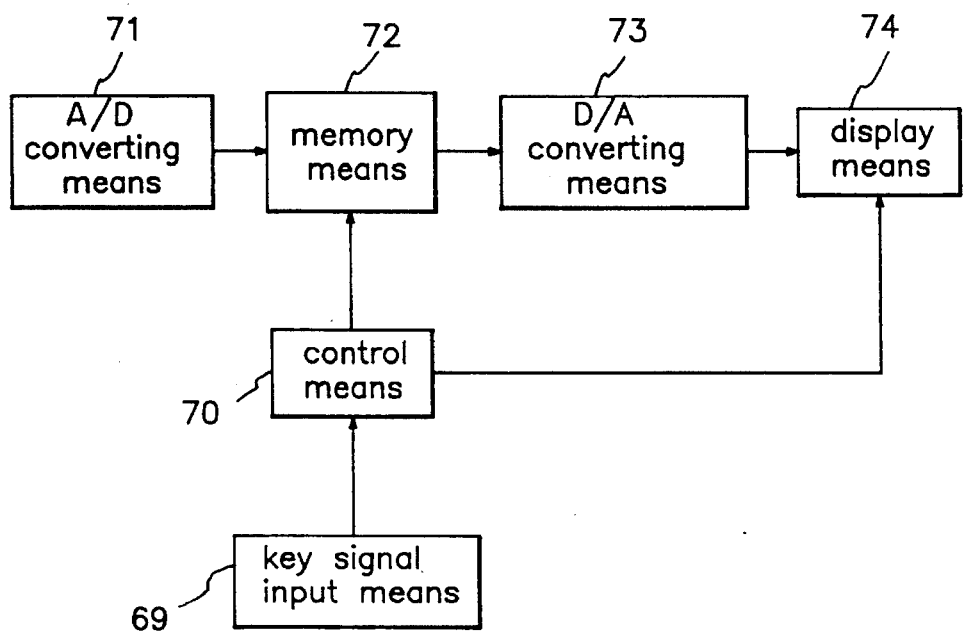
FIG. 16 is a block diagram of a movie camera system in accordance with a fourth embodiment of the present invention.

In FIG. 16, there is shown a block diagram of a movie camera system in accordance with the fourth embodiment of the present invention. As shown in FIG. 16, the movie camera system comprises key signal input means 69 for providing a function select signal for selecting one of a view finding function and a projecting function and control means 70 responsive to the function select signal from the key signal input means 69 for generating a control signal.

The movie camera system also comprises A/D converting means 71 for converting an analog composite video signal inputted therein into a digital composite video signal, memory means 72 for storing the digital composite video signal from the A/D converting means 71, for changing an arrangement of the stored digital composite video signal suitably to the view finding function or the projecting function in response to the control signal from the control means 70 and outputting the digital composite video signal having the changed arrangement, D/A converting means 73 for converting the digital composite video signal outputted by the memory means 72 into an analog composite video signal, and display means 74 responsive to the control signal from the control means 70 for view finding the analog composite video signal from the D/A converting means 73 thereon or for projecting the analog composite video signal on an external screen.

The detailed construction and operation of the fourth embodiment are substantially the same as those of the second and third embodiments, and a description thereof will thus be omitted.

Embodiment V

In a fifth embodiment of the present invention, a frame memory is employed for use in changing the arrangements of the video signals so that the video signals are suitable to the projecting function or the view finding function, in the same manner as those in the second to fourth embodiments. The fifth embodiment of the present invention applies to the entire construction of the movie camera system, in contrast to the second to fourth embodiments.

Figure 17:
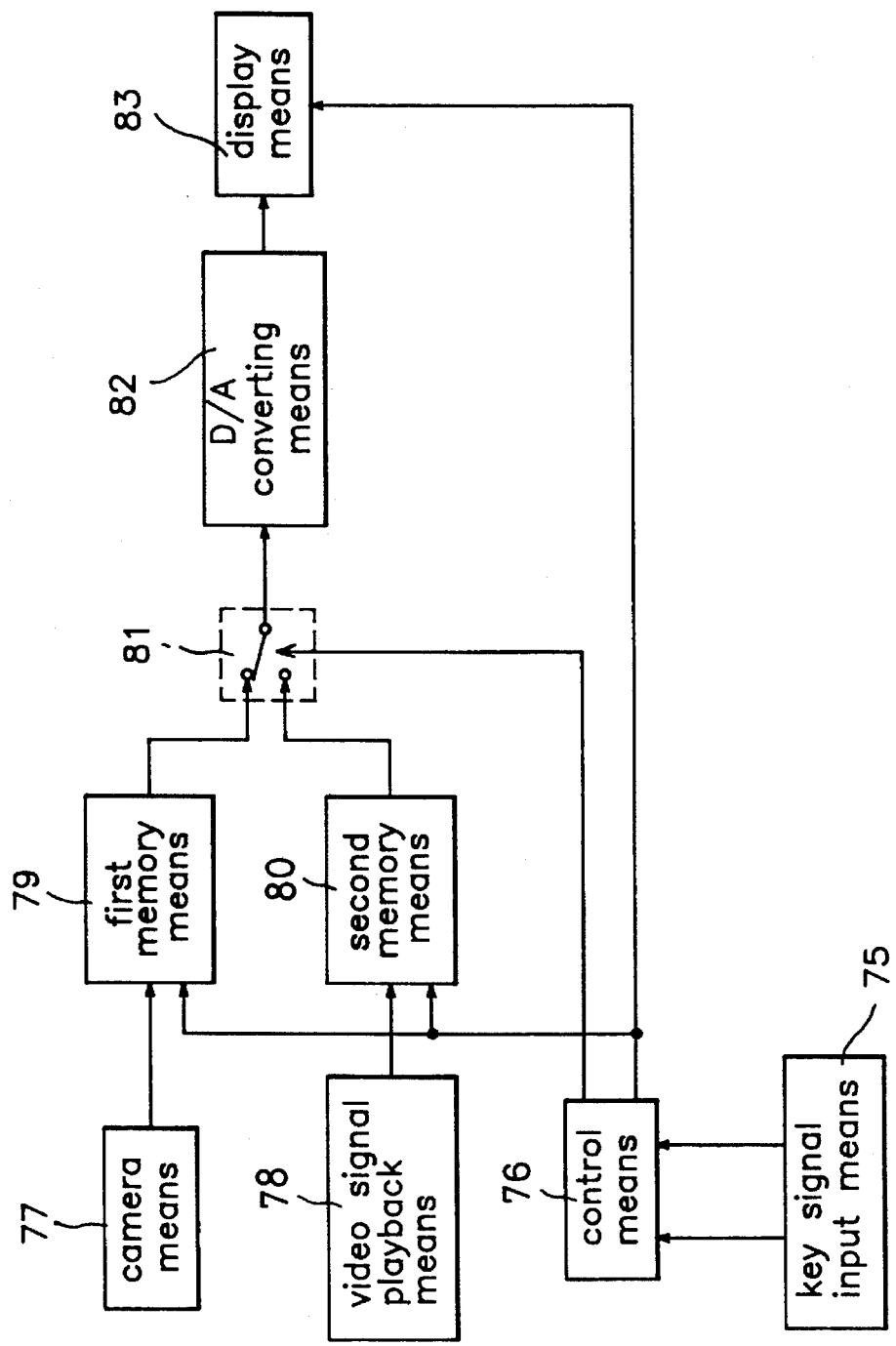
FIG. 17 is a block diagram of a movie camera system in accordance with a fifth embodiment of the present invention.

In FIG. 17, there is shown a block diagram of a movie camera system in accordance with the fifth embodiment of the present invention. As shown in that figure, the movie camera system comprises camera means 77 for imaging an object and converting the resulting image into a digital composite video signal, video signal playback means 78 for playing back a composite video signal recorded on a VCR tape in a digital form, key signal input means 75 for providing a mode select signal for selecting one of the video signal from the camera means 77 and the video signal from the video signal playback means 78 and a function select signal for selecting one of a view finding function and a projecting function, according to a user's selection, and control means 76 for generating a first control signal in response to the function select signal from the key signal input means 75 and a second control signal in response to the mode select signal from the key signal input means 75.

The movie camera system also comprises first memory means 79 for storing the digital composite video signal from the camera means 77, for changing an arrangement of the stored digital composite video signal suitably to the view finding function or the projecting function in response to the first control signal from the control means 76 and outputting the digital composite video signal having the changed arrangement, and second memory means 80 for storing the digital composite video signal from the video signal playback means 78, for changing an arrangement of the stored digital composite video signal suitably to the view finding function or the projecting function in response to the first control signal from the control means 76 and outputting the digital composite video signal having the changed arrangement.

The movie camera system also comprises switching means 81 responsive to the second control signal from the control means 76 for selectively transferring one of the video signal from the first memory means 79 and the video signal from the second memory means 80, D/A converting means 82 for converting the selected digital composite video signal from the switching means 81 into an analog composite video signal, and display means 83 responsive to the first control signal from the control means 76 for view finding the analog composite video signal from the D/A converting means 82 thereon or for projecting the analog composite video signal on an external screen.

The detailed construction and operation of the fifth embodiment are substantially the same as those of the second embodiment, and a description thereof will thus be omitted.

Embodiment VI

In a sixth embodiment of the present invention, a view finder having an LCD panel and LCD driving means are employed for use in changing the arrangements of the video signals so that the video signals are suitable to the projecting function or the view finding function. The sixth embodiment of the present invention applies to all systems which output analog composite video signals.

Figure 18:
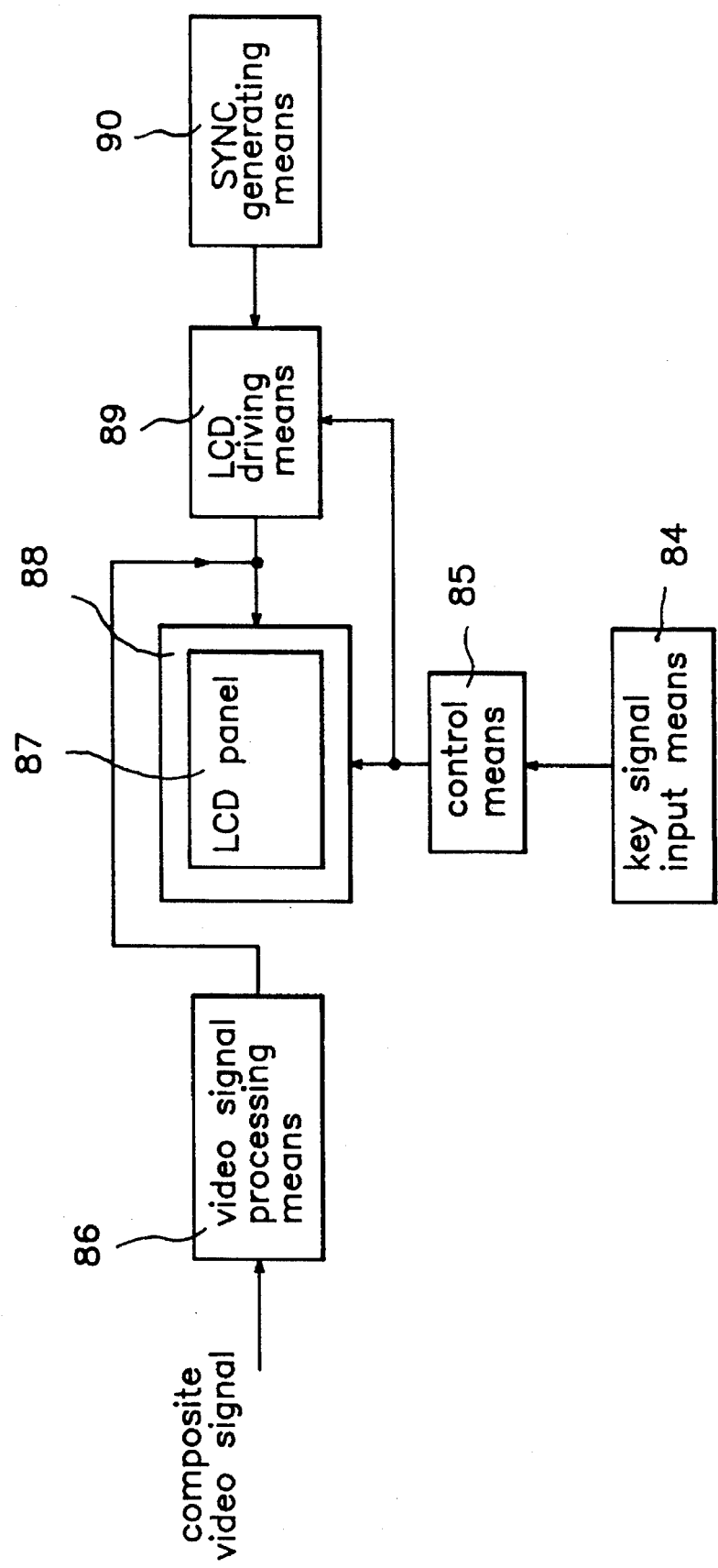
FIG. 18 is a block diagram of a movie camera system in accordance with a sixth embodiment of the present invention.

Referring to FIG. 18, there is shown a block diagram of a movie camera system in accordance with the sixth embodiment of the present invention. As shown in this figure, the movie camera system comprises key signal input means 84 for providing a function select signal for selecting one of a view finding function and a projecting function, control means 85 responsive to the function select signal from the key signal input means 84 for generating a control signal, and video signal processing means 86 for processing an analog composite video signal inputted therein so that it can be displayed. The processed video signals from the video signal processing means 86 correspond respectively to R, G and B color signals.

The movie camera system also comprises a view finder 88 having an LCD panel 87 of a matrix of pixels. The view finder 88 is operative in response to the control signal from the control means 85 for view finding the processed video signals from the video signal processing means 86 on the LCD panel 87 thereof or projecting them on an external screen through the LCD panel 87 thereof.

The movie camera system also comprises synchronous signal generating means 90 for generating a plurality of vertical and horizontal synchronous signals to synchronize vertical and horizontal portions of the video signals being displayed on the LCD panel 87 of the view finder 88 and LCD driving means 89 responsive to the control signal from the control means 85 for changing an arrangement of the video signals from the video signal processing means 86 suitably to the view finding function or the projecting function using the plurality of vertical and horizontal synchronous signals outputted by the synchronous signal generating means 90.

The detailed construction and operation of the sixth embodiment are substantially the same as those of the first embodiment and a description thereof will thus be omitted.

Embodiment VII

A seventh embodiment of the invention is substantially the same as the sixth embodiment, with the exception that it applies particularly to the camera section in the movie camera system.

Figure 19:
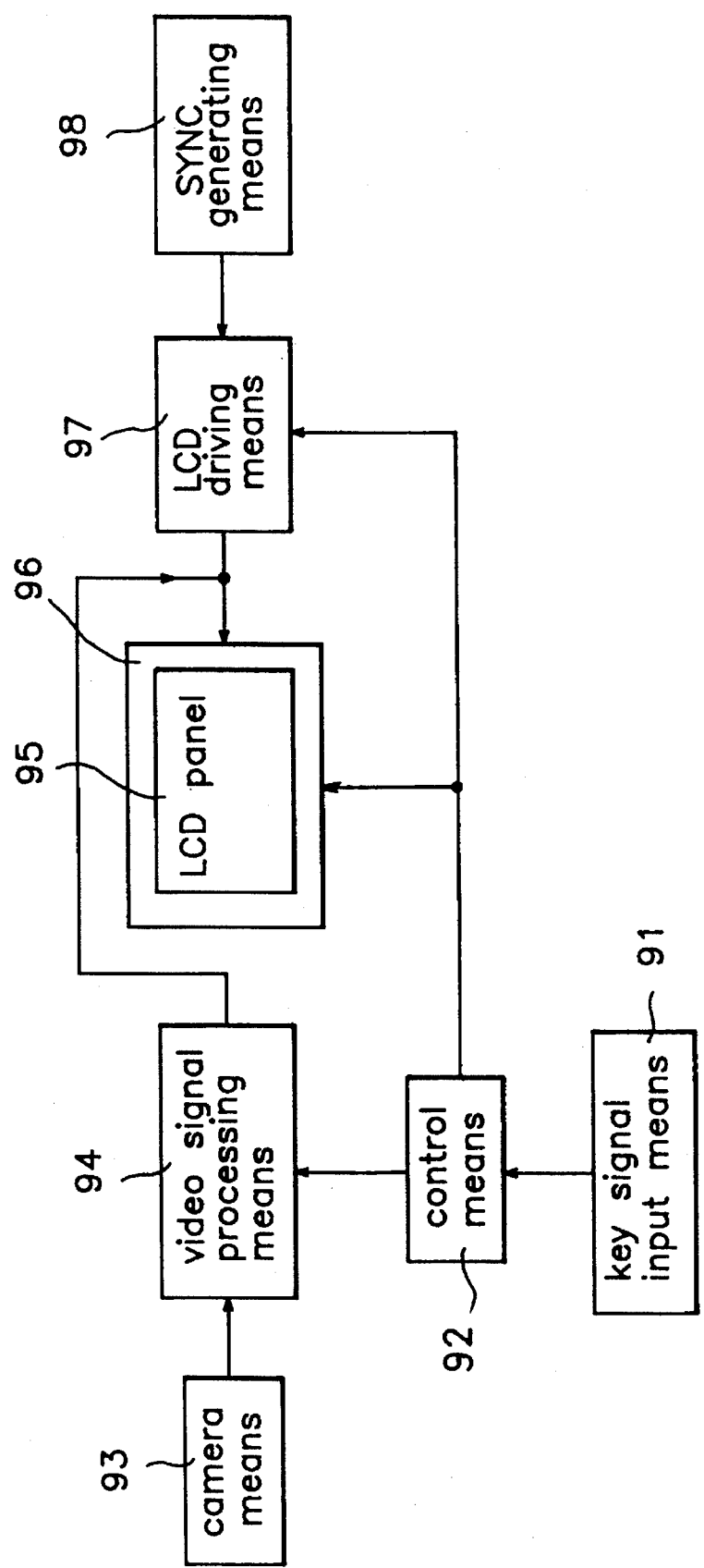
FIG. 19 is a block diagram of a movie camera system in accordance with a seventh embodiment of the present invention.

In FIG. 19, there is shown a block diagram of a movie camera system in accordance with the seventh embodiment of the present invention. As shown in this figure, the movie camera system comprises key signal input means 91 for providing a function select signal for selecting one of a view finding function and a projecting function, control means 92 responsive to the function select signal from the key signal input means 91 for generating a control signal, camera means 93 for imaging an object and converting the resulting image into an electrical composite video signal, and video signal processing means 94 for processing the composite video signal from the camera means 93 so that it can be displayed. The processed video signals from the video signal processing means 94 correspond respectively to R, G and B color signals.

The movie camera system also comprises a view finder 96 having an LCD panel 95 of a matrix of pixels. The view finder 96 is operative in response to the control signal from the control means 92 for view finding the processed video signals from the video signal processing means 94 on the LCD panel 95 thereof or projecting them on an external screen through the LCD panel 95 thereof.

The movie camera system also comprises synchronous signal generating means 98 for generating a plurality of vertical and horizontal synchronous signals to synchronize vertical and horizontal portions of the video signals being displayed on the LCD panel 95 of the view finder 96 and LCD driving means 97 responsive to the control signal from the control means 92 for changing an arrangement of the video signals from the video signal processing means 94 suitably to the view finding function or the projecting function using the plurality of vertical and horizontal synchronous signals outputted by the synchronous signal generating means 98.

The detailed construction and operation of the seventh embodiment are substantially the same as those of the first embodiment, and a description thereof will thus be omitted.

Embodiment VIII

An eighth embodiment of the preferred embodiment is substantially the same as the sixth and seventh embodiments, with the exception that it applies particularly to the VCR section in the movie camera system.

Figure 20:
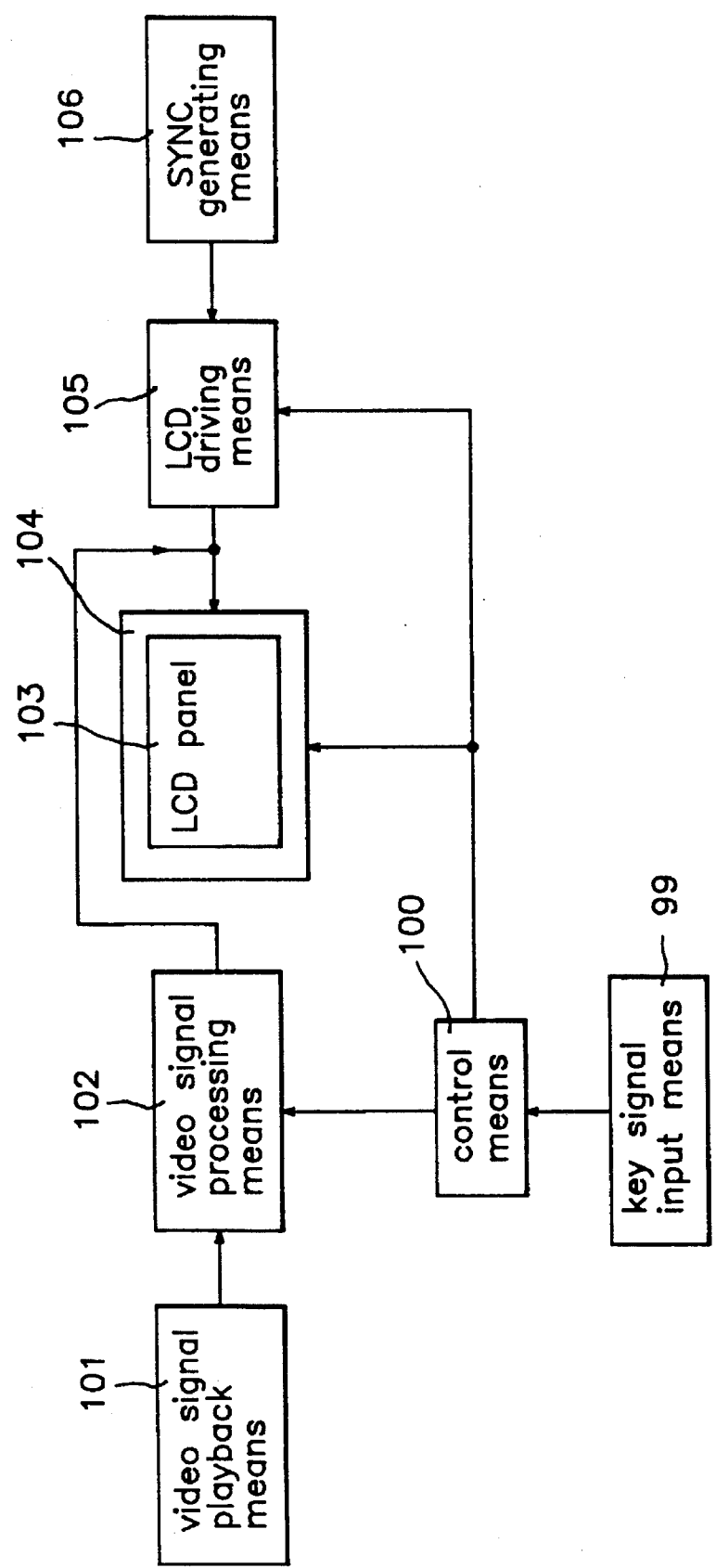
FIG. 20 is a block diagram of a movie camera system in accordance with an eighth embodiment of the present invention.

In FIG. 20, there is shown a block diagram of a movie camera system in accordance with the eighth embodiment of the present invention. As shown in this figure, the movie camera system comprises key signal input means 99 for providing a function select signal for selecting one of a view finding function and a projecting function, control means 100 responsive to the function select signal from the key signal input means 99 for generating a control signal, video signal playback means 101 for playing back a composite video signal recorded on a VCR tape, and video signal processing means 102 for processing the composite video signal from the video signal playback means 101 so that it can be displayed. The processed video signals from the video signal processing means 102 correspond respectively to R, G and B color signals.

The movie camera system also comprises a view finder 104 having an LCD panel 103 of a matrix of pixels. The view finder 104 is operative in response to the control signal from the control means 100 for view finding the processed video signals from the video signal processing means 102 on the LCD panel 103 thereof or projecting them on an external screen through the LCD panel 103 thereof.

The movie camera system also comprises synchronous signal generating means 106 for generating a plurality of vertical and horizontal synchronous signals to synchronize vertical and horizontal portions of the video signals being displayed on the LCD panel 103 of the view finder 104 and LCD driving means 105 responsive to the control signal from the control means 100 for changing arrangements of the video signals from the video signal processing means 102 suitably to the view finding function or the projecting function using the plurality of vertical and horizontal synchronous signals outputted by the synchronous signal generating means 106.

The detailed construction and operation of the eighth embodiment are substantially the same as those of the first embodiment, and a description thereof will thus be omitted.

Embodiment IX

A ninth embodiment of the preferred embodiment is substantially the same as the sixth to eighth embodiments, with the exception that it applies to the entire construction of the movie camera system.

Figure 21:
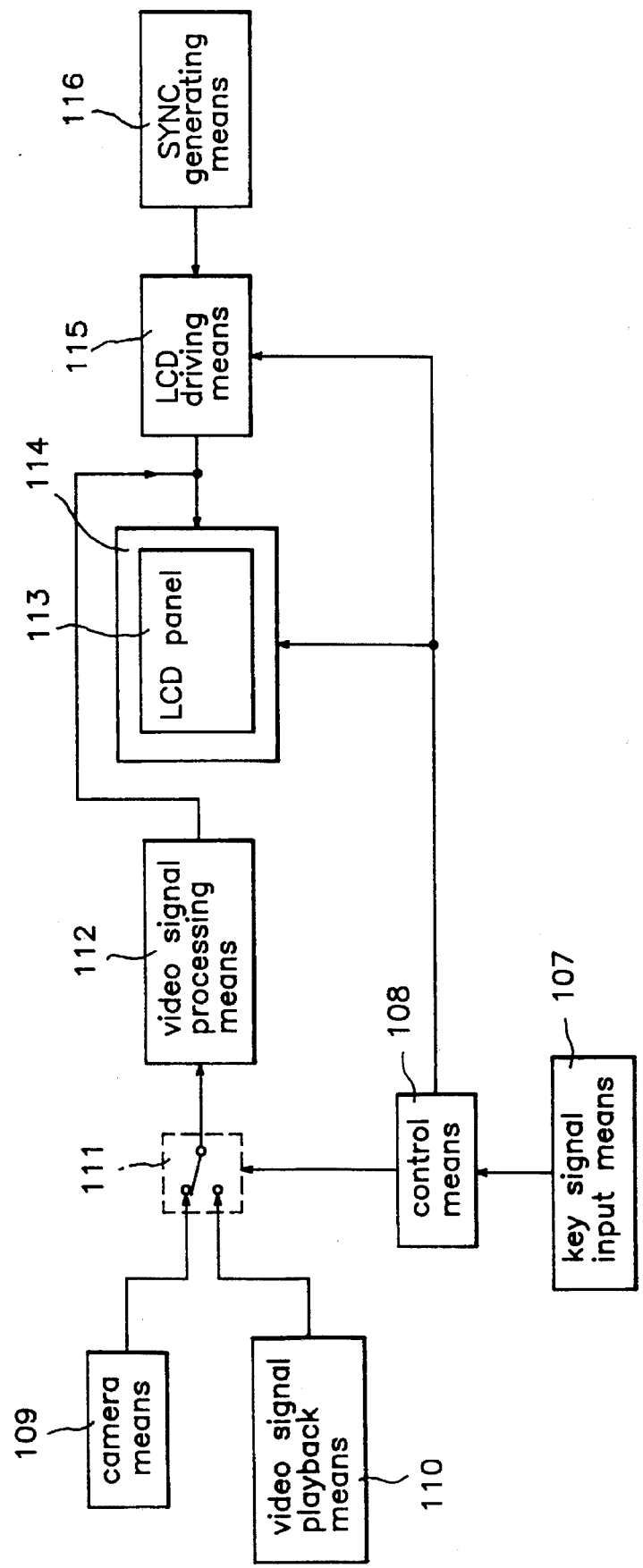
FIG. 21 is a block diagram of a movie camera system in accordance with a ninth embodiment of the present invention.

In FIG. 21, there is shown a block diagram of a movie camera system in accordance with the ninth embodiment of the present invention. As shown in this figure, the movie camera system comprises camera means 109 for imaging an object and converting the resulting image into an electrical composite video signal, video signal playback means 110 for playing back a composite video signal recorded on a VCR tape, key signal input means 107 for providing a mode select signal for selecting one of the video signal from the camera means 109 and the video signal from the video signal playback means 110 and a function select signal for selecting one of a view finding function and a projecting function, according to a user's selection, control means 108 for generating a first control signal in response to the function select signal from the key signal input means 107 and a second control signal in response to the mode select signal from the key signal input means 107, switching means 111 responsive to the second control signal from the control means 108 for selectively transferring one of the video signal from the camera means 109 and the video signal from the video signal playback means 110, and video signal processing means 112 for processing the selected composite video signal from the switching means 111 so that it can be displayed. The processed video signals from the video signal processing means 112 correspond respectively to R, G and B color signals.

The movie camera system also comprises a view finder 114 having an LCD panel 113 of a matrix of pixels. The view finder 114 is operative in response to the first control signal from the control means 108 for view finding the processed video signals from the video signal processing means 112 on the LCD panel 113 thereof or projecting them on an external screen through the LCD panel 113 thereof.

The movie camera system also comprises synchronous signal generating means 116 for generating a plurality of vertical and horizontal synchronous signals to synchronize vertical and horizontal portions of the video signals being displayed on the LCD panel 113 of the view finder 114 and LCD driving means 115 responsive to the first control signal from the control means 108 for changing arrangements of the video signals from the video signal processing means 112 suitably to the view finding function or the projecting function using the plurality of vertical and horizontal synchronous signals outputted by the synchronous signal generating means 116.

The detailed construction and operation of the ninth embodiment are substantially the same as those of the first embodiment, and a description thereof will thus be omitted.

SUMMARY

In the first through ninth embodiments of the present invention, although the LCD panel is used as a display device, a modified CCD or luminescence element (EL) may be used for the display device. Also, the video signal may be recorded on a recording medium such as a compact disk, instead of a VCR tape.

As hereinbefore described, according to the present invention, the following advantages are provided.

First, the view finding function and the projecting function can be performed together in the movie camera system by means of the improvement in the conventional view finder. This results in the function of the movie camera system being maximized.

Second, the image of an object can be projected by the movie camera system, so that it can be monitored simultaneously through a wide screen by many persons. The projecting function of the movie camera system is an advantage, particularly when a separate monitor or television receiver is not available.

Third, the user need not purchase a separate projector since the movie camera system has the projecting function. This provides the user with an economical advantage.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A movie camera and playback system for performing a view finding function or a projection function on an image corresponding to a composite video signal, said system comprising:

key signal input means, responsive to a user selection, for providing a function select signal to select either said view finding function or said projection function;

control means, responsive to the function select signal provided by the key signal input means, for generating a control signal;

video signal playback means for playing back the composite video signal recorded on a recording medium;

video signal processing means for processing the composite video signal played back by the video signal playback means so that the image corresponding to the composite video signal can be displayed, the processed video signal including red, green and blue color signals;

display means having a liquid crystal display (LCD) panel of a matrix of pixels, the display means being operative in response to the control signal from the control means for displaying images corresponding to the composite video signal processed by the video signal processing means on the LCD panel when said control signal indicates a view finding function and for inverting and projecting the images corresponding to the processed composite video signal on an external screen through the LCD panel when said control signal indicates a projection function;

synchronous signal generating means for generating a plurality of vertical and horizontal synchronous signals to synchronize vertical and horizontal portions of the video signal being displayed on the LCD panel of the display means; and LCD driving means, responsive to the control signal from the control means, for arranging an output order of the video signals processed by the video signal processing means using the plurality of vertical and horizontal synchronous signals output by the synchronous signal generating means.

2. The movie camera and playback system as set forth in claim 1, wherein the display means includes:

a light source for generating light;

a light amount controller, responsive to the control signal from the control means, for generating another control signal to control an amount of the light generated by the light source;

a condensing lens for condensing the light generated by the light source;

a first polarizing plate for polarizing the light condensed by the condensing lens toward a rear portion of the LCD panel;

a second polarizing plate for polarizing an optical image on the LCD panel, the optical image resulting from the video signal being displayed on the LCD panel; and a focus lens unit, adjustably spaced from the LCD panel, for focusing the optical image polarized by the second polarizing plate.

3. The movie camera and playback system as set forth in claim 1, wherein the LCD driving means includes:

a horizontal unidirectional register for outputting the plurality of horizontal synchronous signals outputted by the synchronous signal generating means in an input order;

a vertical bidirectional register, responsive to the control signal from the control means, for outputting the plurality of vertical synchronous signals outputted by the synchronous signal generating means in an input order or the reverse order;

a buffer for buffering the plurality of vertical synchronous signals from the vertical bidirectional register and for outputting the buffered vertical synchronous signals in the input order as column drive signals to columns of the LCD panel, downwardly beginning with an uppermost column, or the reverse order; and a sample and holder, the sample and holder including a plurality of transistors, each having a source connected to a corresponding one of output terminals of the video signal processing means, a drain connected to the pixels of a corresponding one of rows of the LCD panel and a gate connected to a corresponding one of output terminals of the horizontal unidirectional register, the plurality of transistors being driven by the corresponding horizontal synchronous signals from the horizontal unidirectional register to sequentially apply the red, green and blue video signals in an input order, to the right beginning with the leftmost pixels of the columns of the LCD panel being driven by the vertical synchronous signals from the buffer.

4. The movie camera and playback system as set forth in claim 3, wherein the vertical bidirectional register includes a plurality of unit elements, the plurality of unit elements each including:

a first inverter gate for inverting a first input signal;

a second inverter gate for inverting a second input signal;

a third inverter gate for inverting output signals from the first and second inverter gates;

a NOR gate for receiving an output signal from the third inverter gate at a first input and a clear signal at a second input and for NORing the received signals;

a fourth inverter gate for inverting an output signal from the NOR gate, an output signal from the fourth inverter gate being applied to the first input of the NOR gate together with the output signal from the third inverter gate; and a fifth inverter gate for inverting the output signal from the NOR gate and for outputting the inverted signal as a final signal.

5. The movie camera and playback system as set forth in claim 3, wherein the vertical bidirectional register of the driving circuit includes a plurality of unit elements, the plurality of unit elements each including:

a first inverter gate for inverting a first input signal;

a second inverter gate for inverting a second input signal;

a third inverter gate for inverting output signals from the first and second inverter gates;

a first NOR gate for receiving an output signal from the third inverter gate at a first input and a clear signal at a second input and for NORing the received signals;

a fourth inverter gate for inverting an output signal from the first NOR gate, an output signal from the fourth inverter gate being applied to the first input of the first NOR gate together with the output signal from the third inverter gate;

a fifth inverter gate for inverting the output signal from the first NOR gate;

a sixth inverter gate for inverting an output signal from the fifth inverter gate;

a second NOR gate for receiving an output signal from the sixth inverter gate at a first input and the clear signal at a second input and for NORing the received signals to output a final signal; and a seventh inverter gate for inverting the final signal from the second NOR gate, an output signal from the seventh inverter gate being applied to the first input of the second NOR gate together with the output signal from the sixth inverter gate.

6. In a movie camera system having a view finder, a camera section, a display means, and a VCR section, the display means including a liquid crystal display (LCD) panel, a method of displaying an image corresponding to a video signal from the camera section or a video signal from the VCR section on the LCD panel of the display means, comprising the steps of:

generating a first control signal in response to a mode select signal input to the movie camera system, said first control signal selects either the video signal output by the camera section or the video signal output by the VCR section;

generating a second control signal in response to a function select signal input to the movie camera system for selecting either a projecting function or a view finding function;

selecting one of the video signal from the camera section and the video signal from the VCR section in response to the first control signal;

processing the selected video signal so that the corresponding image can be displayed on the LCD panel of the view finder;

inverting the processed video signal when the second control signal indicates the projecting function; and view finding the image corresponding to the processed video signal on the LCD panel or projecting the image corresponding to the inverted video signal on an external screen through the LCD panel in response to the second control signal.

* * * * *

UNITED STATES PATENT AND TRADEMARK OFFICE
CERTIFICATE OF CORRECTION

PATENT NO. : 5,483,285
DATED : Jan 9, 1996
INVENTOR(S) : Jae Cheol LIM et al

It is certified that error appears in the above-indentified patent and that said Letters Patent is hereby corrected as shown below:

Item [57],
In the Abstract, line 1, "move" should read --movie--.

In the Abstract, line 7, after "so that", insert --it can--.

In the Abstract, line 11, "junction of" should read --function or--.

Signed and Sealed this

Fifth Day of November, 1996

Attest:

BRUCE LEHMAN

Attesting Officer     Commissioner of Patents and Trademarks